US012577770B2

(12) United States Patent
Einstein

(10) Patent No.: US 12,577,770 B2
(45) Date of Patent: Mar. 17, 2026

(54) APPARATUS FOR INCENTIVIZING A USAGE OF A WASTE DISPOSAL DEVICE BY A USER

(71) Applicant: Throne Topper LLC, Sharon, MA (US)

(72) Inventor: Evan Einstein, Sharon, MA (US)

(73) Assignee: Throne Topper LLC, Sharon, MA (US)

( * ) Notice: Subject to any disclaimer, the term of this patent is extended or adjusted under 35 U.S.C. 154(b) by 0 days.

(21) Appl. No.: 19/183,874

(22) Filed: Apr. 20, 2025

(65) Prior Publication Data

US 2026/0043223 A1     Feb. 12, 2026

Related U.S. Application Data

(60) Provisional application No. 63/681,282, filed on Aug. 9, 2024.

(51) Int. Cl.
| | |
|---|---|
| *E03D 5/10* | (2006.01) |
| *E03D 9/03* | (2006.01) |
| *G09B 19/00* | (2006.01) |

(52) U.S. Cl.
CPC .............. *E03D 5/105* (2013.01); *E03D 9/03* (2013.01); *G09B 19/0007* (2013.01); *G09B 19/0076* (2013.01)

(58) Field of Classification Search
CPC ............ E03D 5/105; E03D 9/03; A47K 11/00
See application file for complete search history.

(56) References Cited

U.S. PATENT DOCUMENTS

| | | | | |
|---|---|---|---|---|
| 6,779,206 B1 * | 8/2004 | Sykes | ..................... | E03D 5/105 |
| | | | | 4/301 |
| 2010/0005582 A1 * | 1/2010 | Rao | ......................... | E03D 13/00 |
| | | | | 4/301 |
| 2018/0163388 A1 * | 6/2018 | Staton | ..................... | G06F 3/002 |
| 2019/0228677 A1 * | 7/2019 | Young | .................... | A47K 11/04 |

* cited by examiner

*Primary Examiner* — Janie M Loeppke
(74) *Attorney, Agent, or Firm* — Dhiraj Jindal; PATENT YOGI LLC

(57) ABSTRACT

An apparatus for incentivizing a usage of a waste disposal device by a user. The apparatus includes a sensor configured for monitoring a parameter associated with the waste disposal device, a processor, and an auxiliary device. The processor is configured for obtaining an information based on the monitoring, analyzing the information, determining an initiation a performance of a waste disposing operation which is activated through a predetermined user action performed by a user based on the analyzing, and generating an initiation command based on the determining of the initiation. The auxiliary device initiates a performance of auxiliary operation which corresponds to a reward for the user based on the initiation command, and terminates the performance of the auxiliary operation based on the termination command. The performance of the auxiliary operation terminates after a completion of the performance of the auxiliary operation.

20 Claims, 19 Drawing Sheets

100

202

106

104

102

108

100

106

1302

1800

1812

- AT LEAST ONE INFORMATION
- AT LEAST ONE INITIATION
  COMMAND
- AT LEAST ONE TERMINATION
  COMMAND

1806

1802        1804

1804

1810

1804

1900

1804

1804

1814

1804

1818

APPARATUS

1816

APPARATUS FOR INCENTIVIZING A USAGE OF A WASTE DISPOSAL DEVICE BY A USER

REFERENCE TO RELATED APPLICATIONS

This application claims the benefit of U.S. Provisional Patent Application No. 63/681,282, titled "A powered device for performing an action based on a toilet flush", filed Aug. 9, 2024, which is incorporated by reference herein in its entirety.

FIELD OF THE INVENTION

Generally, the present disclosure relates to the field of data processing. More specifically, the present disclosure relates to an apparatus for incentivizing a usage of a waste disposal device by a user.

BACKGROUND OF THE INVENTION

Traditional toilets do not provide a special reward to the user for flushing. Existing toilets are deficient with regard to several aspects. For instance, using current toilets helps get rid of waste and smell, but the current toilets do not extend their usage beyond getting rid of waste and smell. As a result, different toilets are needed which incentivizes the usage of the toilets. Furthermore, current toilets do not provide the user with positive feedback on the usage of the toilets. As a result, different toilets are needed that reinforce the usage of the toilets with positive feedback.

Therefore, there is a need for an apparatus for incentivizing a usage of a waste disposal device by a user that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for incentivizing a usage of a waste disposal device by a user, in accordance with some embodiments. Accordingly, the apparatus may include at least one sensor, a processor, and at least one auxiliary device. Further, the at least one sensor may be configured for monitoring at least one parameter associated with the waste disposal device. Further, the processor may be communicatively coupled with the at least one sensor. Further, the processor may be configured for obtaining at least one information associated with the at least one parameter based on the monitoring of the at least one parameter. Further, the processor may be configured for analyzing the at least one information. Further, the processor may be configured for determining an initiation a performance of at least one waste disposing operation associated with the waste disposal device based on the analyzing of the at least one information. Further, the waste disposal device disposes of at least one waste through the at least one waste disposing operation. Further, the at least one waste disposing operation may be activated through a predetermined user action performed by a user. Further, the processor may be configured for generating at least one initiation command based on the determining of the initiation. Further, the at least one auxiliary device may be operatively coupled with the processor. Further, the at least one auxiliary device may be powered. Further, the at least one auxiliary device may be configured for initiating a performance of at least one auxiliary operation based on the at least one initiation command. Further, the performance of the at least one auxiliary operation corresponds to at least one reward for the user of the waste disposal device. Further, the performance of the at least one auxiliary operation terminates after a completion of the performance of the at least one auxiliary operation.

Further disclosed herein is an apparatus for incentivizing a usage of a waste disposal device by a user, in accordance with some embodiments. Accordingly, the apparatus may include at least one sensor, a processor, and at least one auxiliary device. Further, the at least one sensor may be configured for monitoring at least one parameter associated with the waste disposal device. Further, the processor may be communicatively coupled with the at least one sensor. Further, the processor may be configured for obtaining at least one information associated with the at least one parameter based on the monitoring of the at least one parameter. Further, the processor may be configured for analyzing the at least one information. Further, the processor may be configured for determining an initiation of a performance of at least one waste disposing operation associated with the waste disposal device based on the analyzing of the at least one information. Further, the waste disposal device disposes of at least one waste through the at least one waste disposing operation. Further, the at least one waste disposing operation may be activated through a predetermined user action performed by a user. Further, the processor may be configured for generating at least one initiation command based on the determining of the initiation. Further, the at least one auxiliary device may be operatively coupled with the processor. Further, the at least one auxiliary device may be powered. Further, the at least one auxiliary device may be configured for initiating a performance of at least one auxiliary operation based on the at least one initiation command. Further, the performance of the at least one auxiliary operation corresponds to at least one reward for the user of the waste disposal device. Further, the performance of the at least one auxiliary operation terminates after a completion of the performance of the at least one auxiliary operation. Further, the at least one auxiliary operation may include at least one action performed by the at least one auxiliary device. Further, the at least one action may include at least one of a production of at least one movement by at least one movable element of the at least one auxiliary device and an emission of at least one sound by at least one sound emitting element of the at least one auxiliary device.

Further disclosed herein is an apparatus for incentivizing a usage of a waste disposal device by a user, in accordance with some embodiments. Accordingly, the apparatus may include the waste disposal device, at least one sensor, a processor, and at least one auxiliary device. Further, the waste disposal device may include at least one sanitary unit and at least one waste disposing mechanism. Further, the at least one waste disposing mechanism may be configured for performing at least one waste disposing operation. Further, the at least one sensor may be configured for monitoring at least one parameter associated with the waste disposal device. Further, the processor may be communicatively coupled with the at least one sensor. Further, the processor may be configured for obtaining at least one information associated with the at least one parameter based on the monitoring of the at least one parameter. Further, the processor may be configured for analyzing the at least one information. Further, the processor may be configured for determining an initiation of a performance of the at least one waste disposing operation associated with the waste disposal device based on the analyzing of the at least one information. Further, the waste disposal device disposes of at least one waste through the at least one waste disposing operation. Further, the at least one waste disposing operation may be activated through a predetermined user action performed by a user. Further, the processor may be configured for generating at least one initiation command based on the determining of the initiation. Further, the at least one auxiliary device may be operatively coupled with the processor. Further, the at least one auxiliary device may be powered. Further, the at least one auxiliary device may be configured for initiating a performance of at least one auxiliary operation based on the at least one initiation command. Further, the performance of the at least one auxiliary operation corresponds to at least one reward for the user of the waste disposal device. Further, the performance of the at least one auxiliary operation terminates after a completion of the performance of the at least one auxiliary operation.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
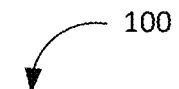
FIG. 1 is a front view of an apparatus 100 for incentivizing a usage of a waste disposal device 108 by a user, in accordance with some embodiments.
Figure 1:
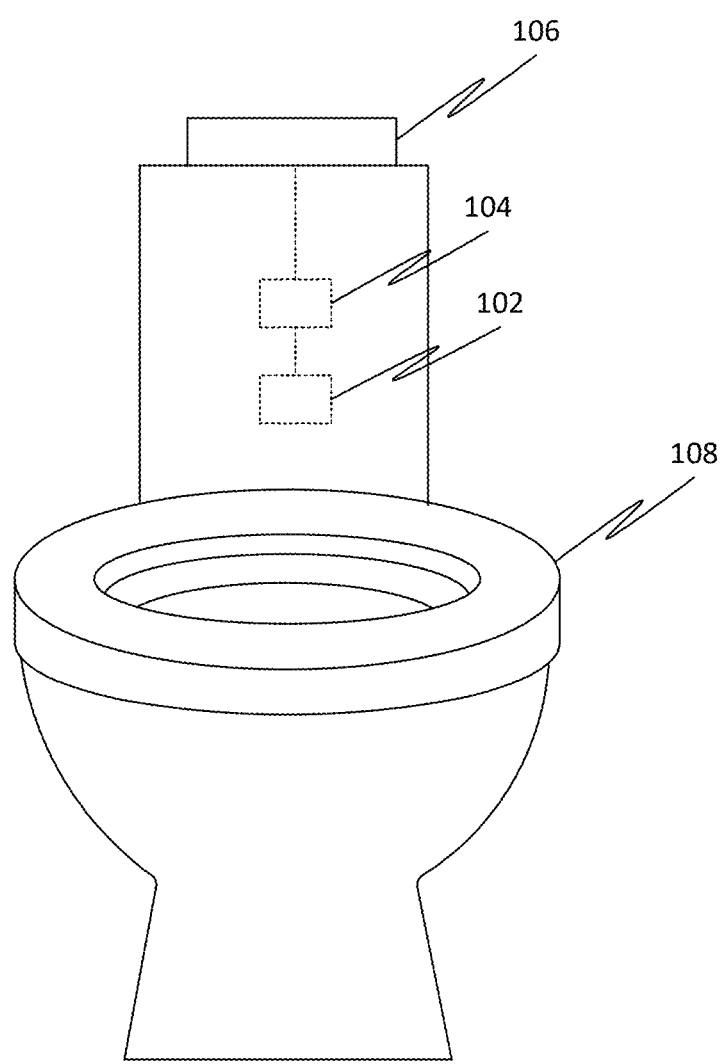

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an apparatus for incentivizing a usage of a waste disposal device by a user, embodiments of the present disclosure are not limited to use only in this context.

In general, the method disclosed herein may be performed by one or more computing devices. For example, in some embodiments, the method may be performed by a server computer (i.e. the one or more computing devices) in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IOT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.).

Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes an apparatus for incentivizing a usage of a waste disposal device by a user.

Further, the present disclosure describes a powered device for performing an action based on a toilet flush.

Further, the present disclosure describes an electronic device that detects (using a sensor/probe) the flushing action of a toilet, automatically activating a powered device, such as a small Ferris wheel with a motor, and/or a light and/or sound generator that plays a certain music and/or an air-freshener dispenser. The device then automatically stops based on the ending of the flush process.

Further, there are the following toilet varieties:

Gravity-flush: In this type of toilet, water is held in a tank, and when the user 'flushes' (presses a button, lever, or handle), water leaves the tank for flushing.

Pressure-assisted: In this type of toilet, there are tanks, like a gravity-flush, but the chamber inside the tanks is pressurized and where the water is kept.

Flushometer: In this type of toilet, there is no tank. A flush initiates pressurized water directly from a pipe.

Vacuum: In this type of toilet, there are no tanks, and flushing causes water and a suction action.

Waterless: In this type of toilet (i.e. a compost toilet or an outhouse toilet), there is no flush.

Further, there are the following ways to initiate flush in the toilets:

Push Button (single or dual)

Turn Lever

Foot pedal

Touchless/sensor

Further, there are the following possible toilet/reward activation methods:

Water level sensing

Electrical continuity probe

Capacitance probe

Sonar

Hearing water.

Microphone in or out of the tank to 'hear' the flush

Feel the flush

Vibration sensor (notices either water flow, flush lever movement, or vibration from user movement).

The tilt sensor connected to the flush lever

Smell

'Sniff' the air in the toilet bowl and wait for it to go from smelly to neutral.

Water flow

Detector connected to the water inlet, fill hose, or toilet bowl fill hole.

Sensing user

A similar mechanism to a touchless toilet-sense the user moving away from the toilet.

Weight sensor on the floor in front of toilet-sense change from weight to no weight.

This electronic device is a toilet add-on that provides the user with positive feedback for initiating the flushing action. There exists a device that is mounted on the toilet handle to detect pressing/tilting, and in turn, causes a song to play. There are also complete toy toilets that play sounds when flushed. Neither of these devices interacts with a flush action based on the toilet water level. These devices are also not compatible with all styles of tank toilets such as ones that flush with a push button.

Further, the powered device consists of two main parts, a Probe and the 'Action Item.' For the Probe, one end of the Probe sits inside a toilet's clean water tank. This end is at least partially submerged in the toilet's clean water tank when the toilet is at rest. When the toilet is initially flushed by a user, the water level in the clean water tank goes down and is sensed by the Probe. The Probe may work by various mechanisms such as: electrical conductivity sensing when water is present, causing two probe wires to complete a circuit; or a standard float switch that floats on the water and creates electrical continuity when the change in water level causes it to float into position. The other end of the Probe is connected to the main device, the 'Action Item.' This resides on the outside of the toilet, possibly on top of the toilet tank or a nearby shelf. When the toilet is flushed, the Probe relays the signal to the 'Action Item' to initiate an action (motion, sound, light, and/or scents). The action ends when the action is completed. 'Action Item' examples include but are not limited to a Ferris wheel that, when activated, spins with a motor; a lighthouse with an LED that lights up and rotates with a motor; and flowers that sway with a motor and play a song with a speaker while activated. All of these 'Action Items' start their actions based on the flush as sensed and relayed by the Probe.

Further, in an embodiment, the probe again senses the water level in the tank which is rising back as the flush progresses. When the water level in the tank rises back up, the Probe relays that signal to the 'Action Item' to begin the end of the device's action.

Further, the present disclosure describes a new device that can be added to an existing toilet's water tank. It rewards the user for flushing the toilet. It works with almost any toilet that uses a water tank, regardless of the flush trigger (i.e.

push handle or push button). The action initiates and possibly deactivates based on the water level in the toilet's clean water tank.

Further, the present disclosure describes an addon for a tank-type toilet consisting of an 'Action Item' and a Probe that senses a toilet flush by monitoring the water level in the toilet's clean water tank. When the flush lowers the water level, the 'Action Item' starts its action. Further, the action rewards the user for completing a flush by performing an action such as starting a motor; and/or illuminating; and/or a sound generator that plays a certain sound or music; and/or an air-freshener dispenser that dispenses a scent. Further, in an embodiment, after the flush ends and the water level rises back up which is detected to cause the action to begin its completion.

Further, the present disclosure describes a device that sits in a bathroom on the tank of a toilet and activates when a flush is detected via a capacitance probe inside the tank. An example is a small Ferris wheel that spins and plays a song.

Further, in some embodiments, the device includes a mechanism that starts and stops based on the water level in the toilet tank. Further, in some embodiments, the device includes a mechanism that only starts based on the water level/flushing and stops after a song completes. Further, the variations of the device include a spinning Ferris wheel, a dancing/spinning teddy bear, dancing/swaying flowers, and a few others. All are battery operated and use a motor for motion. All are fun 'rewards'.

The 'action' of the device is to be initiated by a flush of the toilet. This is going to be monitored by a capacitive probe that is sitting in the water of the toilet tank. When the water level goes down, the probe is out of the water and relays the change in capacitance to the controller. Other triggering possibilities include a probe for electrical continuity, a microphone to hear the flush, a motion sensor to watch the water, and a depth sensor to watch the water level. Further, if the flush is to be detected using the microphone, there could be a problem of false detections based on sounds of shower water, tap water, or any other similar sounds in the restroom. Accordingly, a sound spectrum analysis (e.g. pattern recognition) may need to be employed for discerning the sound of the flush from other sounds.

Further, sounds are played for each of the actions (a short song is played with each activation). Sound will have a volume control, including off/mute.

Further, a photoresistor may be implemented with the device to automatically mute, or possibly completely disable the entire activation when the bathroom light is dim/dark.

Further, lights may be implemented with the device for the reward or the lights that might be more useful (to see when the bathroom is dark). Further, scents, other sounds such as sound effects, water movement (like a fountain), a counter to display the number of flushes, and a leak detector/alarm based on the water change in the tank may be implemented with the device.

Further, the present disclosure describes a powered device for performing an action based on a flushing action on a toilet.

Further, the present disclosure describes detecting (using a sensor/probe) the flushing action of a toilet and automatically activating a powered device, such as a Ferris wheel, or a light or sound generator that plays a certain music or an air-freshener dispenser that automatically stops when the flushing is stopped.

Further, the present disclosure describes using a probe comprising an electrical conductivity sensor to detect both the initiation and the ending of a flushing action in a toilet and accordingly activate and deactivate a powered device.

Further, the present disclosure describes an apparatus configured to be adapted to fit on an existing sanitary unit (i.e. a toilet). Further, the apparatus may be a retrofit unit. Further, the apparatus may include a sensor (i.e. probe), a processor (i.e. controller), and an auxiliary device (i.e. a powered device).

Further, the present disclosure describes an apparatus comprising a sanitary unit (i.e. a toilet), a sensor, a processor, and an auxiliary device.

FIG. 1 is a front view of an apparatus 100 for incentivizing a usage of a waste disposal device 108 by a user, in accordance with some embodiments. Accordingly, the apparatus 100 may include at least one sensor 102, a processor 104, and at least one auxiliary device 106.

Further, the at least one sensor 102 may be configured for monitoring at least one parameter associated with the waste disposal device 108. Further, the at least one sensor 102 may include a probe. Further, the at least one sensor 102 may include a sound sensor, a vibration sensor, a motion sensor, a fluid level sensor, a fluid depth sensor, an odor sensor (i.e. chemical sensor), a fluid flow sensor, an air pressure sensor, a liquid pressure sensor, etc. Further, the waste disposal device 108 may include a toilet, a urinal, etc. Further, the at least one parameter may include sound, vibration, movement, fluid level, fluid depth, odor (i.e. volatile organic compounds such as sulfur, hydrogen sulfide, methane, etc.), fluid flow, air pressure, liquid pressure, etc. Further, the monitoring may include sensing, detecting, etc.

Further, the processor 104 may be communicatively coupled with the at least one sensor 102. Further, the processor 104 may include a processing unit, a processing device, a controller, a microprocessor, a microcontroller, etc. Further, the processor 104 may be configured for obtaining at least one information associated with the at least one parameter based on the monitoring of the at least one parameter. Further, the obtaining of the at least one information may include generating the at least one information associated with the at least one parameter based on the monitoring of the at least one parameter. Further, the processor 104 may be configured for analyzing the at least one information. Further, the processor 104 may be configured for determining an initiation a performance of at least one waste disposing operation associated with the waste disposal device 108 based on the analyzing of the at least one information. Further, the at least one waste disposing operation flushing, suctioning, cleaning, etc. Further, the waste disposal device 108 disposes of at least one waste through the at least one waste disposing operation. Further, the disposing of the at least one waste may include removing, cleaning, transferring, evacuating, expulsing, eliminating, purging, etc. Further, the at least one waste may include excreta (i.e. human excreta, animal excreta, etc.). Further, the usage of the waste disposal device 108 corresponds to performing the at least one waste disposing operation after discarding the at least one waste into the waste disposal device 108. Further, the at least one waste disposing operation may be activated through a predetermined user action performed by a user. Further, the predetermined user action may include a triggering action, a triggering event, etc. Further, the predetermined user action may include a pressing of a button of the waste disposal device 106, a pressing of a pedal of the waste disposal device 106, a pulling of a handle of the waste disposal device 106, a pulling of a chain of the waste disposal device 106, a pulling of a lever of the waste disposal device 106, a closing of a lid of the waste disposal device 106, a gesturing of the user, a movement of the user, etc. Further, the processor 104 may be configured for generating at least one initiation command based on the determining of the initiation.

Further, the at least one auxiliary device 106 may be operatively coupled with the processor 104. Further, the at least one auxiliary device 106 may be powered. Further, the at least one auxiliary device 106 may be electrically powered, motor-powered, battery powered, hydraulically powered, pneumatically powered, etc. Further, the at least one auxiliary device 106 may be configured for initiating a performance of at least one auxiliary operation based on the at least one initiation command. Further, the performance of the at least one auxiliary operation corresponds to at least one reward for the user of the waste disposal device 108. Further, the performance of the at least one auxiliary operation terminates after a completion of the performance of the at least one auxiliary operation. Further, the performance of the at least one auxiliary operation terminates upon the completion of the performance of the at least one auxiliary operation. Further, the at least one auxiliary operation may be associated with at least one time duration. Further, the completion of the performance of the at least one auxiliary operation corresponds to an elapsing of the at least one time duration after the initiating of the performance of the at least one auxiliary operation. Further, the at least one auxiliary operation stops, ends, etc. after a completion of the performance of the at least one auxiliary operation.

Further, in some embodiments, the processor 104 may be configured for determining a termination of the performance of the at least one waste disposing operation after the initiation of the performance of the at least one waste disposing operation based on the analyzing of the at least one information. Further, the processor 104 may be configured for generating at least one termination command based on the determining of the termination. Further, the at least one auxiliary device 106 may be configured for terminating the performance of the at least one auxiliary operation after the initiating of the performance of the at least one auxiliary operation based on the at least one termination command. Further, the initiation of the performance of the at least one waste disposing operation corresponds to a trigger event of the performance of the at least one auxiliary operation. Further, in an embodiment, the determining of the termination of the performance of the at least one waste disposing operation after the initiation of the performance of the at least one waste disposing operation may be based on the at least one auxiliary operation. Further, the at least one auxiliary operation may be associated with at least one operation duration. Further, the determining of the termination of the performance of the at least one waste disposing operation may be further based on an elapsing of the at least one operation duration.

Figure 2:
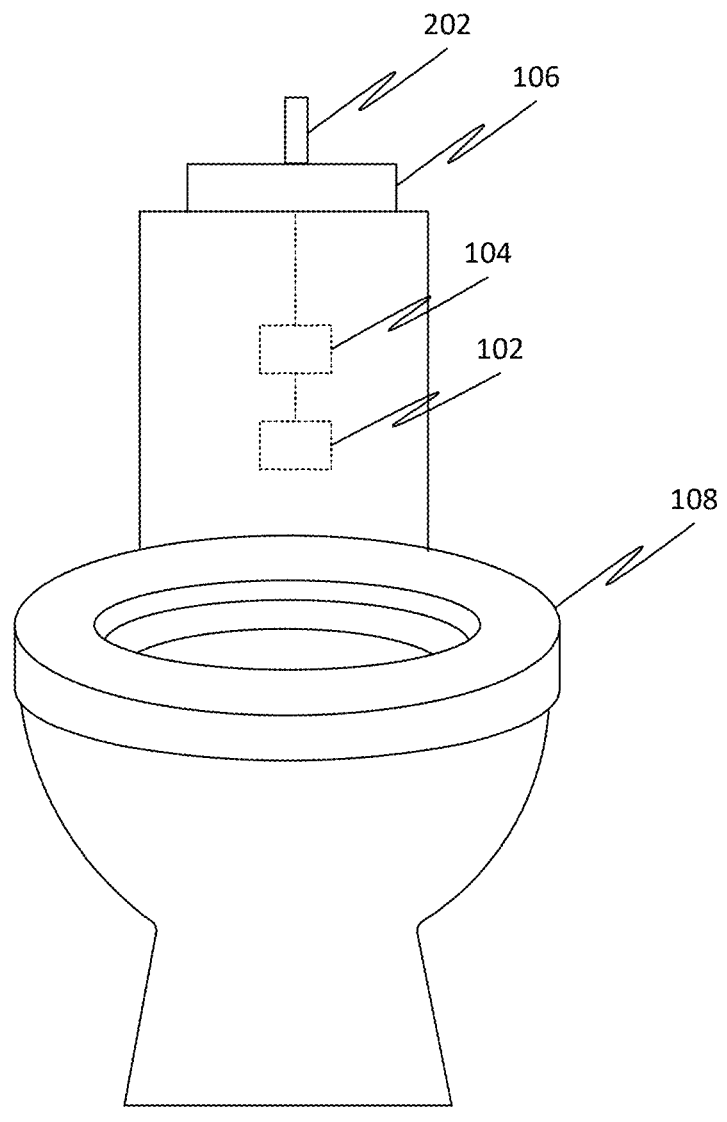
FIG. 2 is a front view of the apparatus 100, in accordance with some embodiments.
Figure 3:
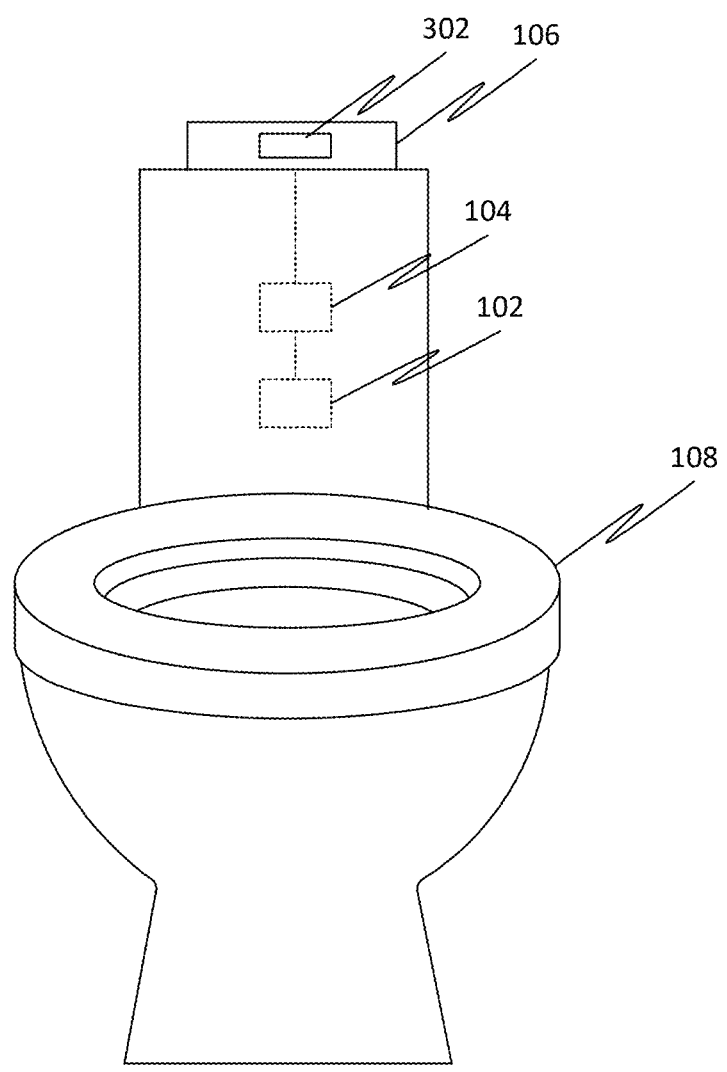
FIG. 3 is a front view of the apparatus 100, in accordance with some embodiments.
Figure 4:
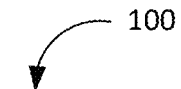
FIG. 4 is a front view of the apparatus 100, in accordance with some embodiments.
Figure 4:
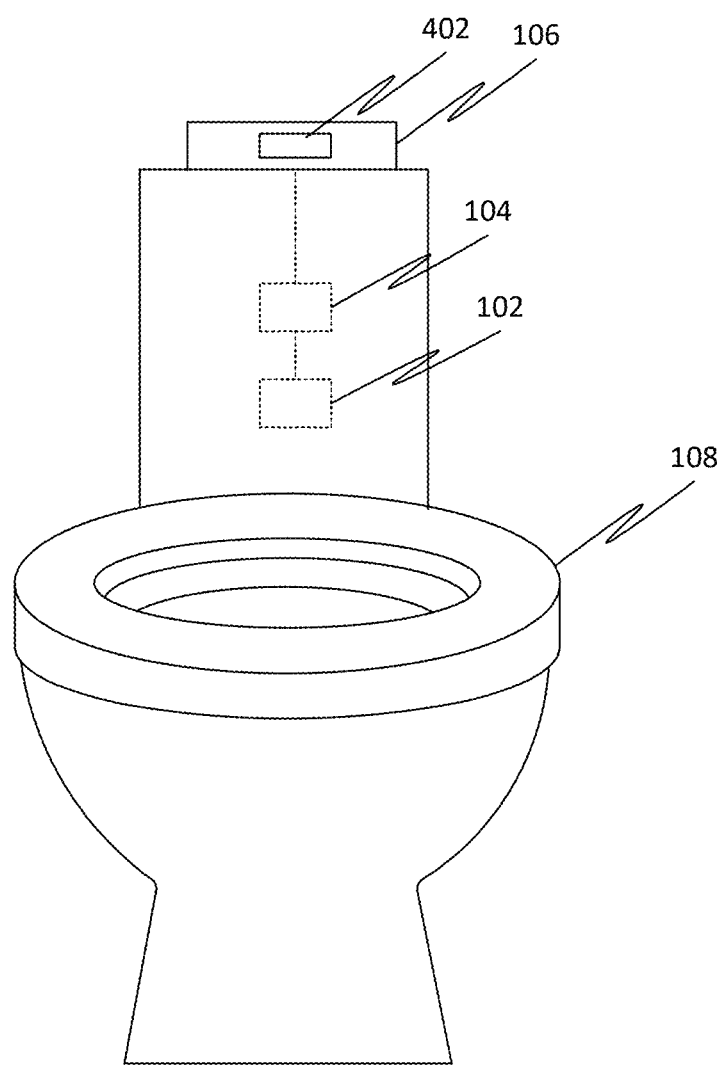
Figure 5:
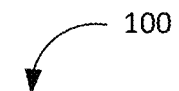
FIG. 5 is a front view of the apparatus 100, in accordance with some embodiments.
Figure 5:
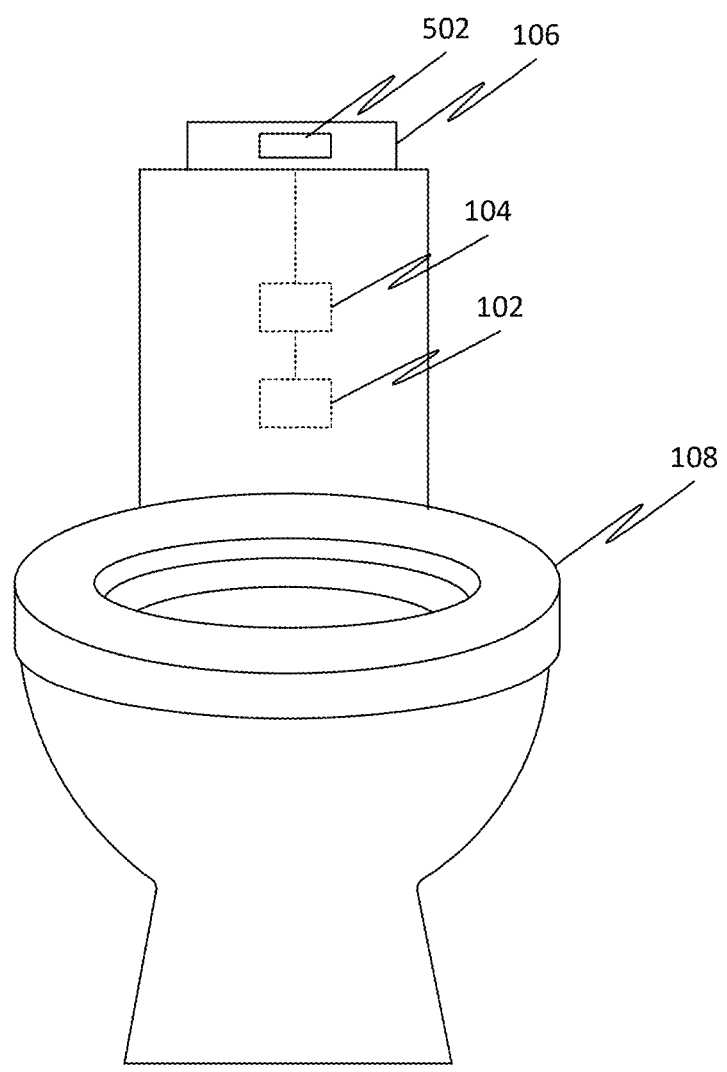

Further, in some embodiments, the at least one auxiliary operation may include at least one action performed by the at least one auxiliary device 106. Further, the at least one action may include at least one of a production of at least one movement by at least one movable element 202, as shown in FIG. 2, of the at least one auxiliary device 106, an emission of at least one light by at least one light emitting element 302, as shown in FIG. 3, of the at least one auxiliary device 106, an emission of at least one sound by at least one sound emitting element 402, as shown in FIG. 4, of the at least one auxiliary device 106, and an emission of at least one odorous agent by the at least one odor emitting element 502, as shown in FIG. 5, of the at least one auxiliary device 106. Further, the emission of the at least one sound may include playing of the at least one sound. Further, the emission of the at least one light may include illuminating with the at least one light. Further, the emission of the at least one odorous agent may include dispensing of the at least one odorous agent. Further, the at least one movement may be periodic. Further, the at least one movement may include a rotatory movement, a linear movement, a pivoting movement, a swinging movement, a turning movement, etc. Further, the at least one movable element 202 may include a disk, a shaft, a ring, etc. Further, the at least one light emitting element 302 may include a light emitting diode (LED), an incandescent bulb, a fluorescent tube, etc. Further, the at least one light may be associated with at least one portion of the electromagnetic spectrum. Further, the at least one sound emitting element 402 may include a speaker. Further, the at least one sound may include a music, a song, a speech, a tone, etc. Further, the at least one odor emitting element 502 a dispenser. Further, the at least one odorous agent may include a scent, a perfume, a fragrant, etc. Further, the at least one odorous agent has a pleasant smell.

Figure 6:
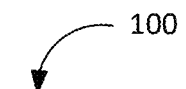
FIG. 6 is a front view of the apparatus 100, in accordance with some embodiments.
Figure 6:
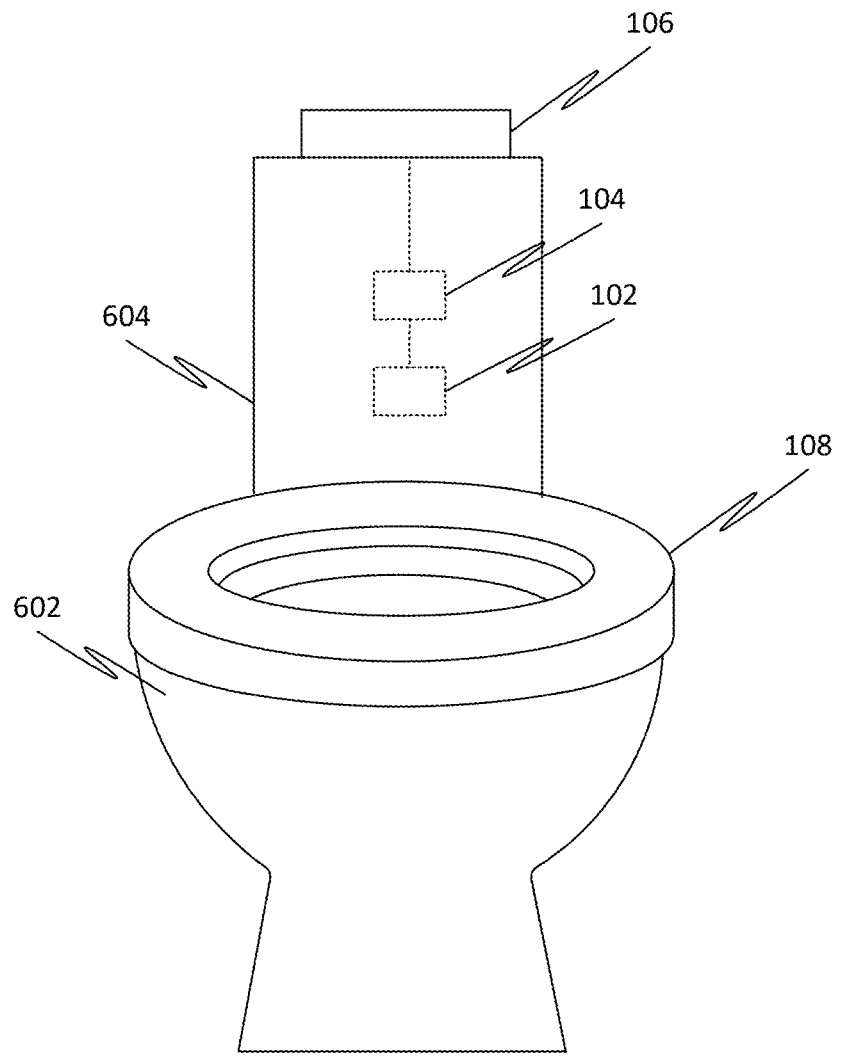

Further, in some embodiments, the waste disposal device 108 may include at least one sanitary unit 602 and at least one waste disposing mechanism 604, as shown in FIG. 6. Further, the at least one sanitary unit 602 may include a toilet bowl, a toilet receptacle, a urinal, a bidet, etc. Further, the at least one waste disposing mechanism 604 may be configured for performing the at least one waste disposing operation. Further, the at least one waste disposing mechanism 604 a gravity flush mechanism, a pressure assisted flush mechanism, a vacuum assisted flush mechanism, a dual flush mechanism, a siphon jet flush mechanism, a pump powered flush mechanism, etc.

Figure 7:
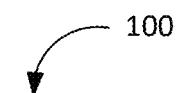
FIG. 7 is a front view of the apparatus 100, in accordance with some embodiments.
Figure 7:
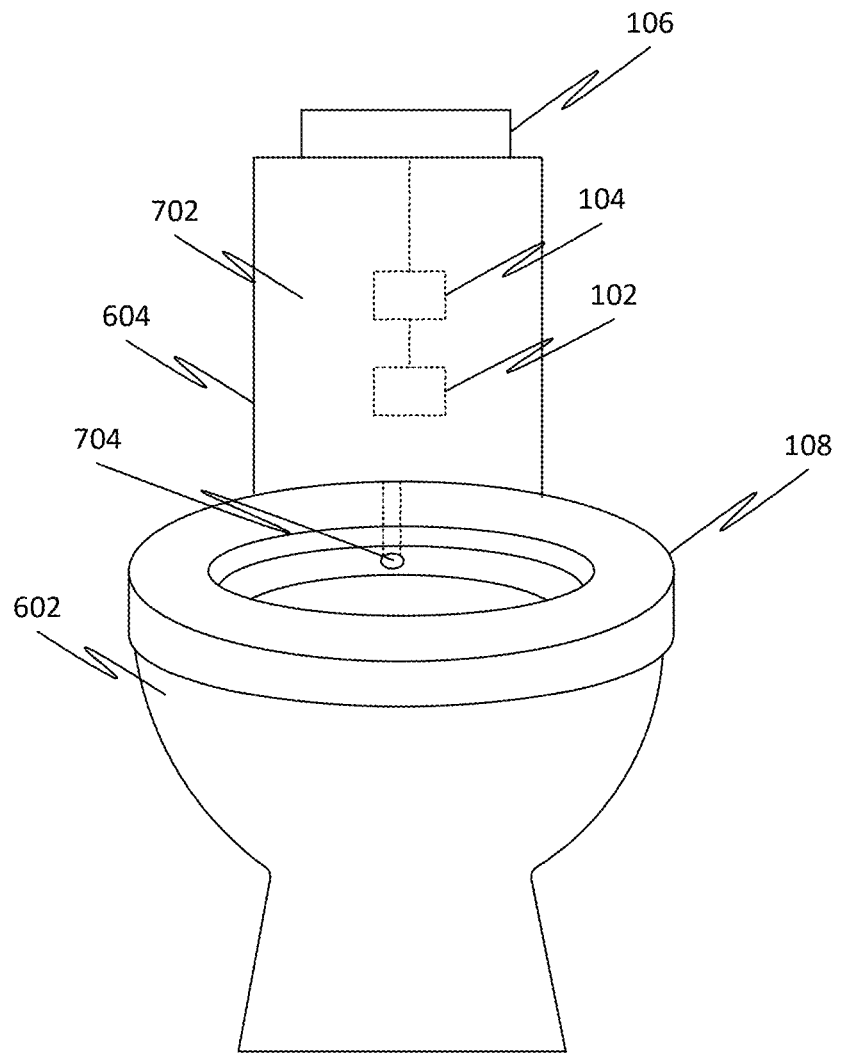

Further, in an embodiment, the at least one waste disposing mechanism 604 may include at least one cleaning agent dispensing mechanism 702, as shown in FIG. 7. Further, the at least one cleaning agent dispensing mechanism 702 may be configured for dispensing at least one cleaning agent into the at least one sanitary unit 602 through at least one port 704, as shown in FIG. 7, comprised in the at least one sanitary unit 602. Further, the at least one cleaning agent may include air, water, bleach solution, citric acid solution, chlorined water, disinfection solution, detergent solution, fragrant solution, etc. Further, the performing of the at least one waste disposing operation may include the dispensing of the at least one cleaning agent into the at least one sanitary unit 602.

Further, in an embodiment, the at least one parameter may include a flow rate of the at least one cleaning agent dispensible into the at least one sanitary unit 602 through the at least one port 704. Further, the processor 104 may be further configured for comparing the flow rate of the at least one cleaning agent with a reference flow rate of zero based on the analyzing of the at least one information. Further, the determining of the initiation of the performance of the at least one waste disposing operation may be further based on the comparing of the flow rate. Further, the performance of the at least one waste disposing operation initiates when the flow rate of the at least one cleaning agent exceeds the reference flow rate of zero. Further, in an embodiment, the determining of the termination of the performance of the at least one waste disposing operation may be further based on the comparing of the flow rate. Further, the performance of the at least one waste disposing operation terminates when the flow rate of the at least one cleaning agent restores to the reference flow rate of zero.

Figure 8:
FIG. 8 is a front view of the apparatus 100, in accordance with some embodiments.
Figure 8:
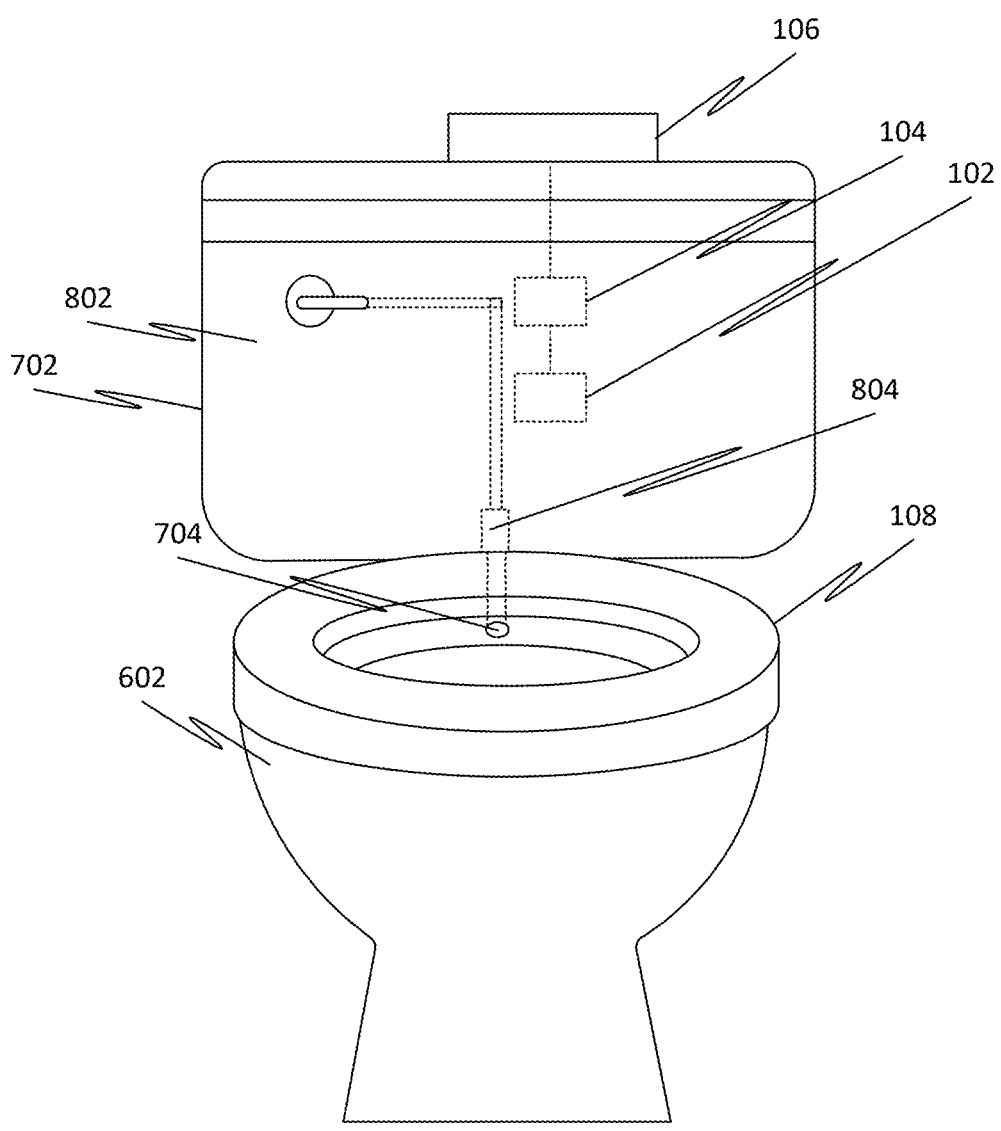

Further, in an embodiment, the at least one cleaning agent dispensing mechanism 702 may include at least one cleaning agent reservoir 802, as shown in FIG. 8, and at least one dispensing actuator 804, as shown in FIG. 8, coupled with the at least one cleaning agent reservoir 802. Further, the at least one cleaning agent reservoir 802 may include a tank, a container, a flush tank, etc. Further, the at least one cleaning agent reservoir 802 may include at least one outlet fluidly coupled with the at least one port 704. Further, the at least one cleaning agent reservoir 802 may be fluidly coupled with the at least one port 704. Further, the at least one dispensing actuator 804 may include at least one valve (such as a fill valve, a flush valve, etc). Further, the at least one valve may be electrically actuated, mechanically actuated, etc. Further, the at least one valve may be comprised in the at least one outlet. Further, the at least one cleaning agent reservoir 802 may be configured for storing the at least one cleaning agent. Further, the at least one dispensing actuator 804 may be configured to be transitioned between a first state and a second state. Further, the first state may include an opened state, and the second state may include a closed state. Further, the at least one dispensing actuator 804 allows flowing of the at least one cleaning agent from the at least one cleaning agent reservoir 802 to the at least one sanitary unit 602 through the at least one port 704 in the first state. Further, the at least one dispensing actuator 804 restricts the flowing of the at least one cleaning agent from the at least one cleaning agent reservoir 802 to the at least one sanitary unit 602 through the at least one port 704 in the second state. Further, the dispensing of the at least one cleaning agent into the at least one sanitary unit 602 may include the flowing of the at least one cleaning agent from the at least one cleaning agent reservoir 802 to the at least one sanitary unit 602 through the at least one port 704.

Further, in an embodiment, the at least one parameter may include an amount of the at least one cleaning agent stored in the at least one cleaning agent reservoir 802. Further, the amount of the at least one cleaning agent corresponds to a level of the at least one cleaning agent in the at least one cleaning agent reservoir 802. Further, the processor 104 may be further configured for comparing the amount of the at least one cleaning agent stored in the at least one cleaning agent reservoir 802 with a threshold amount of the at least one cleaning agent. Further, the determining of the initiation of the performance of the at least one waste disposing operation may be further based on the comparing. Further, the performance of the at least one waste disposing operation initiates when the amount of the at least one cleaning agent falls below the threshold amount. Further, in an embodiment, the determining of the performance of the termination of the at least one waste disposing operation may be further based on the comparing. Further, the performance of the at least one waste disposing operation terminates when the amount of the at least one cleaning agent restores to the threshold amount.

Figure 9:
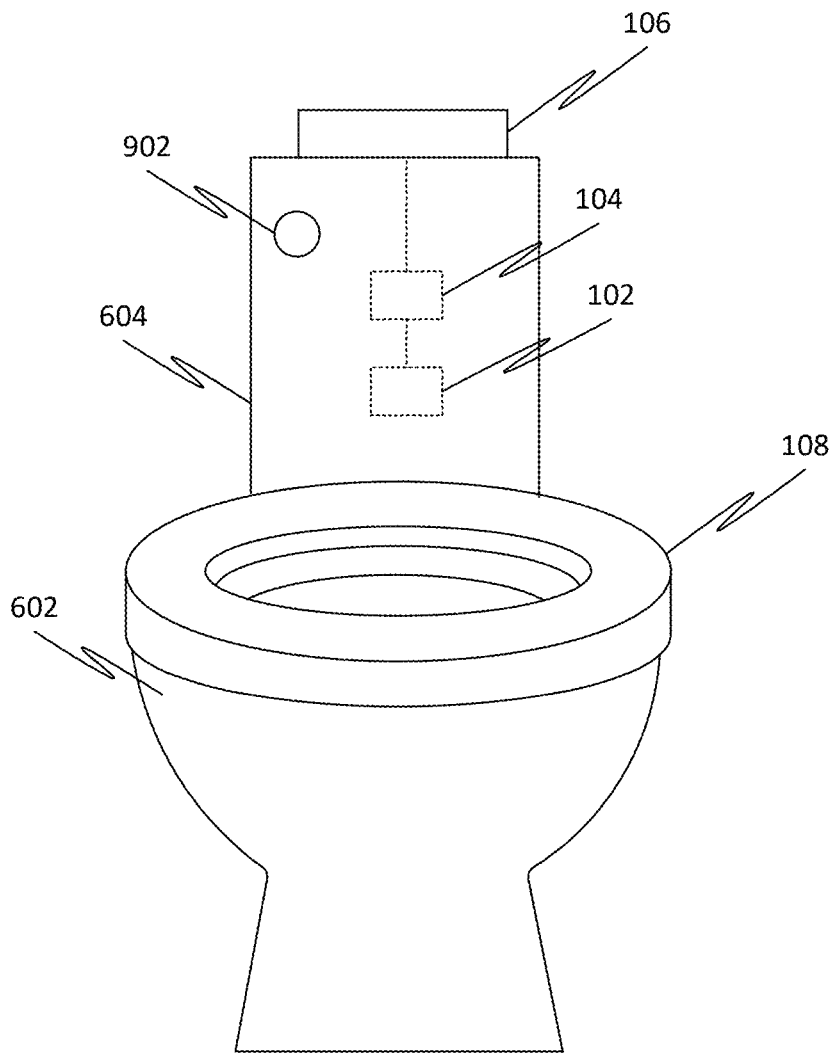
FIG. 9 is a front view of the apparatus 100, in accordance with some embodiments.

Further, in an embodiment, the waste disposal device 108 may include at least one triggering device 902, as shown in FIG. 9. Further, the at least one triggering device 902 may include a button, a lever, a handle, a lid, a motion sensor, a weight sensor, a position sensor, etc. Further, the at least one triggering device 902 may be configured for receiving at least one input from the user. Further, the at least one input may include a triggering action, a flush triggering action, etc. Further, the at least one input may include a pressing action, a pulling action, a moving action, a gesture, an unscating, a lid closing, a movement, etc. Further, the at least one triggering device 902 may be configured for actuating the at least one waste disposing mechanism 604 based on the receiving of the at least one input. Further, the performing of the at least one waste disposing operation may be based on the actuating of the at least one waste disposing mechanism 604.

Further, in an embodiment, the at least one parameter may include a condition associated with at least one of the at least one triggering device 902 and the at least one sanitary unit 602. Further, the condition may include sound, vibration, orientation, position, movement, etc. Further, the processor 104 may be further configured for comparing the condition with at least one predetermined condition associated with at least one of the at least one triggering device 902 and the at least one sanitary unit 602 based on the analyzing of the at least one information. Further, the determining of the initiation of the performance of the at least one waste disposing operation may be further based on the comparing of the condition. Further, in an embodiment, the determining of the performance of the termination of the at least one waste disposing operation may be further based on the comparing of the condition.

Figure 10:
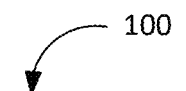
FIG. 10 is a front view of the apparatus 100, in accordance with some embodiments.
Figure 10:
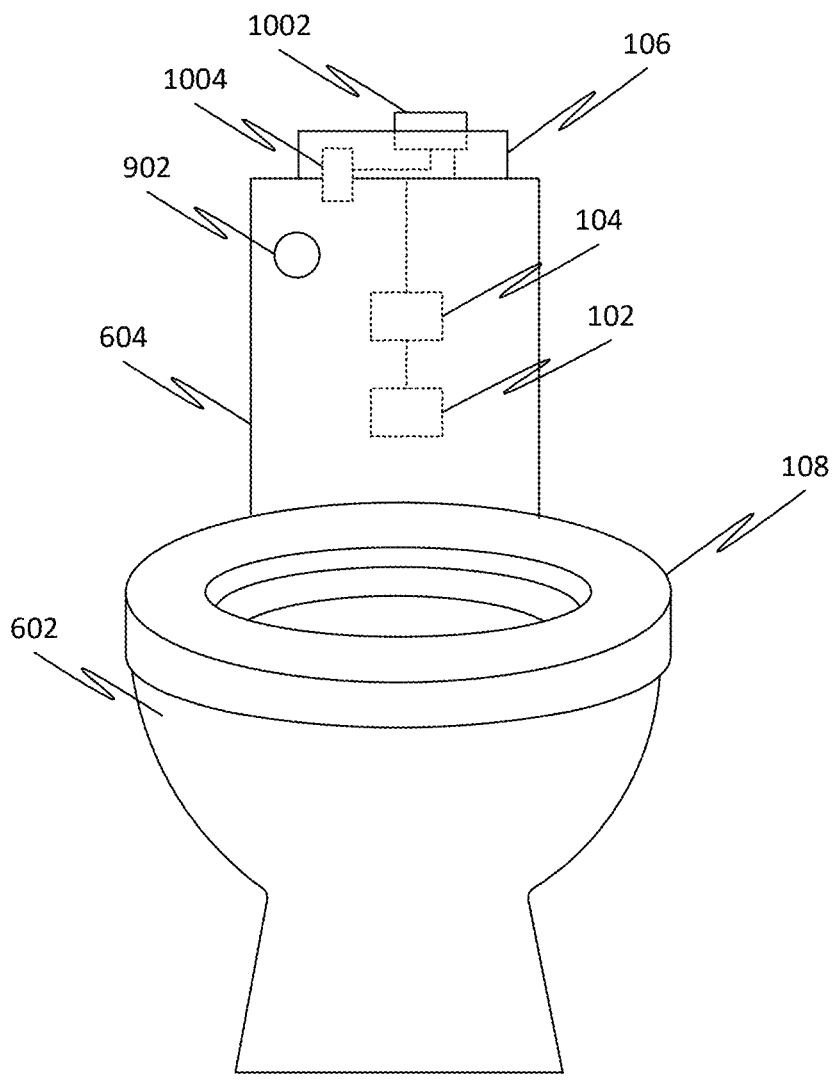

Further, in an embodiment, the at least one auxiliary device 106 may include at least one auxiliary unit 1002 and at least one coupling mechanism 1004, as shown in FIG. 10. Further, the at least one auxiliary unit 1002 may be comprised of an action item, a lighting element, a speaker, a scent dispenser, etc. Further, the at least one auxiliary unit 1002 may include an object, an item, an article, a device, a powered device, etc. Further, the at least one auxiliary unit 1002 may include at least one decorative element. Further, the at least one coupling mechanism 1004 may include a mechanical device, an electrical device, an electronic device, etc. Further, the at least one coupling mechanism 1004 may be operatively coupled with the at least one auxiliary unit 1002. Further, the at least one coupling mechanism 1004 may be configured for actuating the at least one auxiliary unit 1002 based on the actuating of the at least one waste disposing mechanism 604. Further, the at least one auxiliary unit 1002 may be configured for performing the at least one auxiliary operation. Further, the performing of the at least one auxiliary operation may be based on the actuating of the at least one auxiliary unit 1002.

Further, in an embodiment, the at least one auxiliary unit 1002 may be operatively coupled with the at least one waste disposing mechanism 604. Further, the at least one waste disposing mechanism 604 may be further configured for powering the at least one auxiliary unit 1002 based on the performing of the at least one waste disposing operation. Further, the performing of the at least one waste disposing operation powers the at least one auxiliary unit 1002. Further, the performing of the at least one auxiliary operation may be further based on the powering of the at least one auxiliary unit 1002.

Figure 11:
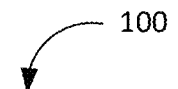
FIG. 11 is a front view of the apparatus 100, in accordance with some embodiments.
Figure 11:
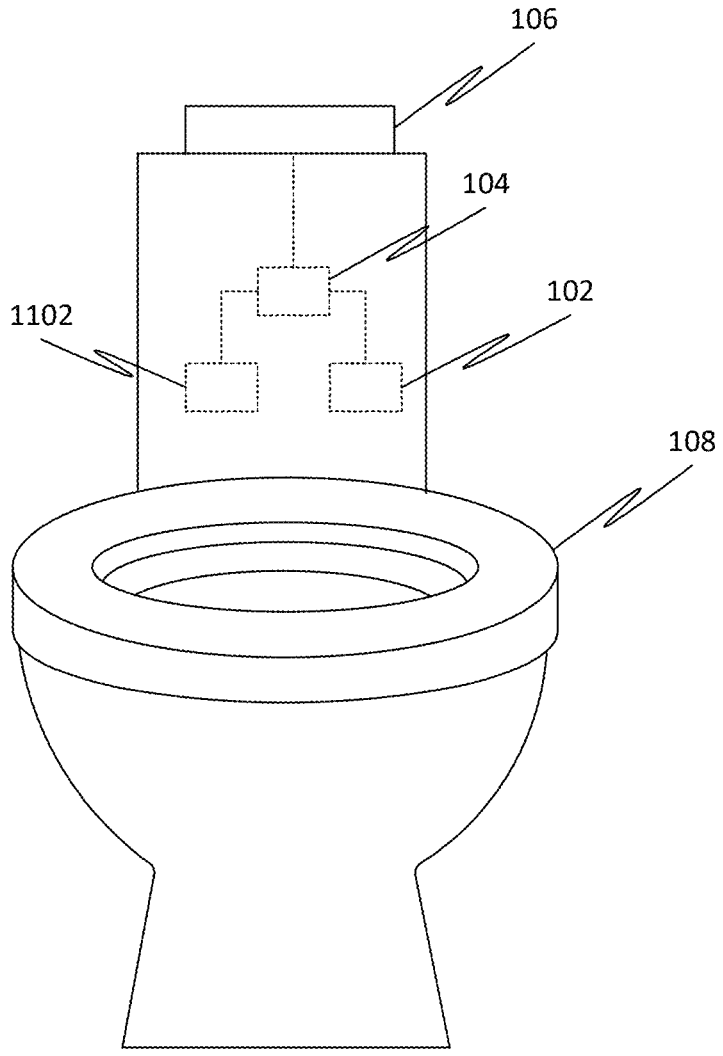

In further embodiments, the apparatus 100 may include at least one additional sensor 1102, as shown in FIG. 11, communicatively coupled with the processor 104. Further, the at least one additional sensor 1102 may include at least one image sensor, at least one audio sensor, at least one motion sensor, at least one weight sensor, etc. Further, the at least one additional sensor 1102 may be configured for detecting a user action of the user. Further, the processor 104 may be configured for obtaining at least one user action information associated with the user action based on the detecting. Further, the processor 104 may be configured for analyzing the at least one user action information. Further, the processor 104 may be configured for determining a performance of the predetermined user action by the user based on the analyzing of the at least one user action information. Further, the determining of the initiation of the performance of the at least one waste disposing operation may be further based on the performance of the predetermined user action.

Further, in an embodiment, the analyzing of the at least one user action information may include analyzing the at least one user action information using at least one machine learning model. Further, the at least one machine learning model may include a support vector machine, a convolutional neural network (CNN), a recurrent neural network (RNN), a Long Short-Term Memory network, etc. Further, the analyzing of the at least one user action information using the at least one machine learning model may include extracting a plurality of action features representing at least one action characteristic of the user action from the at least one user action information. Further, the analyzing of the at least one user action information using the at least one machine learning model may include inputting the plurality of action features into the at least one machine learning model. Further, the at least one machine learning model may be configured for detecting the performance of the predetermined user action. Further, the analyzing of the at least one user action information using the at least one machine learning model may include obtaining an action output indicating a likelihood of the performance of the predetermined user action from the at least one machine learning model. Further, the determining of the performance of the predetermined user action may be further based on the action output.

Further, in an embodiment, the analyzing of the at least one information may include analyzing the at least one information using at least one additional machine learning model. Further, the at least one additional machine learning model may include a support vector machine, a convolutional neural network (CNN), a recurrent neural network (RNN), a Long Short-Term Memory network, etc. Further, the analyzing of the at least one information using the at least one additional machine learning model may include extracting a plurality of operation features representing at least one operation characteristic of the at least one waste disposing operation from the at least one information. Further, the analyzing of the at least one information using the at least one additional machine learning model may include inputting the plurality of operation features and the plurality of action features into the at least one additional machine learning model. Further, the at least one additional machine learning model may be configured for detecting the initiation of the performance of the at least one waste disposing operation. Further, the analyzing of the at least one information using the at least one additional machine learning model may include obtaining an operation output indicating a likelihood of the initiation of the performance of the at least one waste disposing operation from the at least one additional machine learning model. Further, the determining of the initiation of the performance of the at least one waste disposing operation may be further based on the operation output.

Further, in some embodiments, the at least one parameter may include a sound associated with the waste disposal device 108. Further, the analyzing of the at least one information may include performing a sound spectrum analysis on the at least one information. Further, the analyzing of the at least one information may include generating a plurality of sound spectrums based on the performing of the sound spectrum analysis. Further, the analyzing of the at least one information may include inputting the plurality of sound spectrums in a first machine learning model. Further, the first machine learning model may include a support vector machine, a convolutional neural network (CNN), a recurrent neural network (RNN), a Long Short-Term Memory network, etc. Further, the first machine learning model may be trained using a training data comprising a plurality of training samples. Further, each of the plurality of training samples may include a training sound spectrum and a sound identifier corresponding to the training sound spectrum. Further, the first machine learning model may be configured for analyzing the plurality of sound spectrums for determining a likelihood of a sound sample comprised in the sound may be a waste disposing operation sound associated with the at least one waste disposing operation. Further, the analyzing of the at least one information may include obtaining an output indicating the likelihood of the sound sample comprised in the sound may be the waste disposing operation sound from the first machine learning model. Further, the determining of the initiation of the performance of the at least one waste disposing operation may be further based on the output. Further, in an embodiment, the determining of the termination of the performance of the at least one waste disposing operation may be further based on the output.

Further, in some embodiments, the at least one parameter may include an odor associated with the waste disposal device 108. Further, the odor may be associated with the at least one waste. Further, the odor corresponds to one or more volatile organic compounds (i.e. ammonia, hydrogen sulfide, methane, etc.) indicative of the at least one waste. Further, the analyzing of the at least one information may include sequentially analyzing the at least one information. Further, the processor 104 may be configured for determining a trend of an intensity of the odor based on the sequentially analyzing. Further, the processor 104 may be configured for determining an indication in the trend indicating a decline in the intensity of the odor based on the determining of the trend. Further, the determining of the initiation of the performance of the at least one waste disposing operation may be further based on the determining of the indication in the trend. Further, the processor 104 may be configured for determining a decline of the trend below a predefined threshold based on the determining of the trend. Further, in an embodiment, the determining of the termination of the performance of the at least one waste disposing operation may be further based on the determining of the decline.

Figure 12:
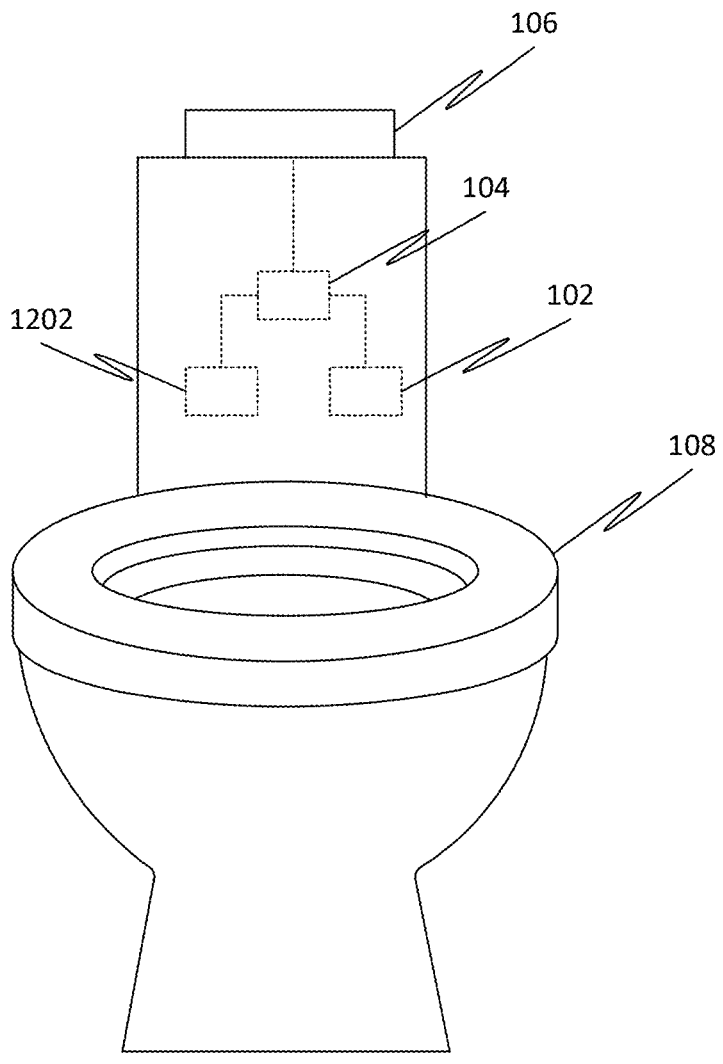
FIG. 12 is a front view of the apparatus 100, in accordance with some embodiments.

In further embodiments, the apparatus 100 may include at least one activation sensor 1202, as shown in FIG. 12, communicatively coupled with the processor 104. Further, the at least one activation sensor 1202 may include a photosensor, an airflow sensor, a thermal sensor, etc. Further, the at least one activation sensor 1202 may be configured for monitoring an environment condition associated with an environment of the waste disposal device 108. Further, the environment condition may include light, airflow, human presence, etc in the environment. Further, the processor 104 may be configured for obtaining at least one environment condition information associated with the environment condition based on the monitoring of the environment condition. Further, the processor 104 may be configured for analyzing the at least one environment condition information. Further, the processor 104 may be configured for determining the environment condition being an activating environment condition based on the analyzing of the at least one condition information. Further, the processor 104 may be configured for generating at least one activation command for the at least one auxiliary device 106 based on the determining of the environment condition being the activating environment condition. Further, the at least one auxiliary device 106 may be configured to be transitioned to an active state from an inactive state based on the at least one activation command. Further, the initiating of the performance of the at least one auxiliary operation may be based on the active state of the at least one auxiliary device 106.

Further, in an embodiment, the at least one auxiliary device 106 remains in the inactive state until the at least one auxiliary device 106 transitions to the active state from the inactive state. Further, the at least one auxiliary device 106 may be further configured to be transitioned to the inactive state from the active state after of the completion of the performance of the at least one auxiliary operation, and an elapsing of at least one time duration.

FIG. 2 is a front view of the apparatus 100, in accordance with some embodiments.

FIG. 3 is a front view of the apparatus 100, in accordance with some embodiments.

FIG. 4 is a front view of the apparatus 100, in accordance with some embodiments.

FIG. 5 is a front view of the apparatus 100, in accordance with some embodiments.

FIG. 6 is a front view of the apparatus 100, in accordance with some embodiments.

FIG. 7 is a front view of the apparatus 100, in accordance with some embodiments.

FIG. 8 is a front view of the apparatus 100, in accordance with some embodiments.

FIG. 9 is a front view of the apparatus 100, in accordance with some embodiments.

FIG. 10 is a front view of the apparatus 100, in accordance with some embodiments.

FIG. 11 is a front view of the apparatus 100, in accordance with some embodiments.

FIG. 12 is a front view of the apparatus 100, in accordance with some embodiments.

Figure 13:
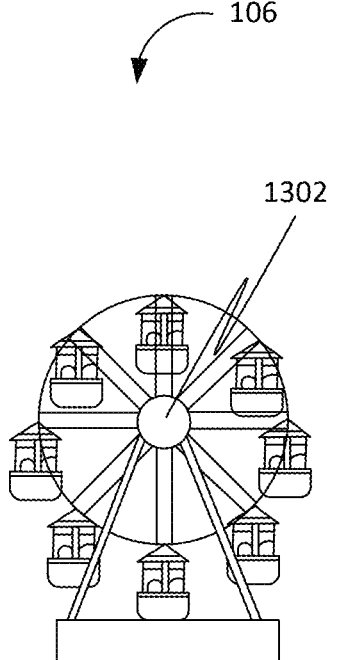
FIG. 13 is a front view of the at least one auxiliary device 106 of the apparatus 100, in accordance with some embodiments.

FIG. 13 is a front view of the at least one auxiliary device 106 of the apparatus 100, in accordance with some embodiments. Further, the at least one auxiliary device 106 may include at least one action item 1302. Further, the at least one action item 1302 may include a Ferris wheel.

Figure 14:
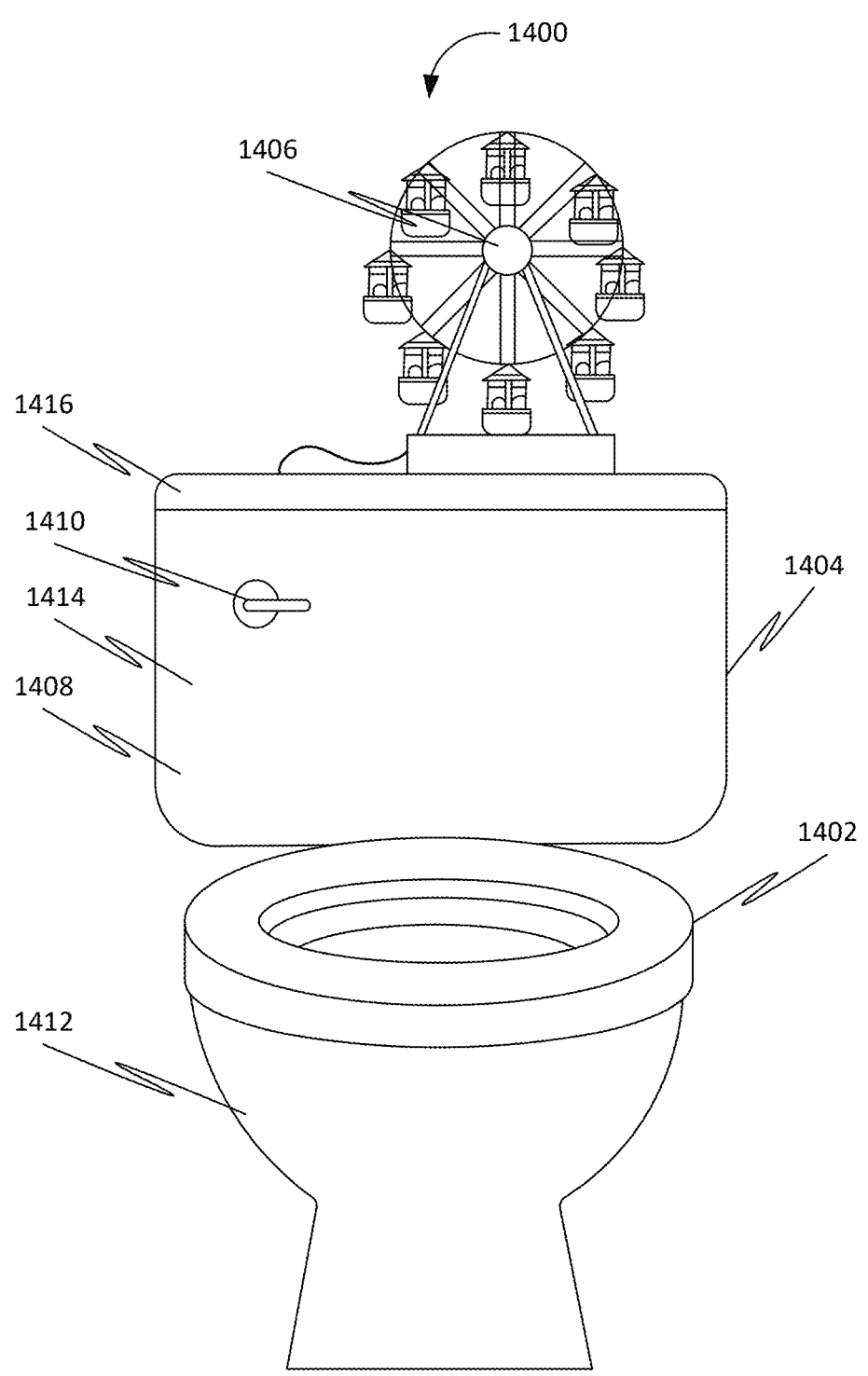
FIG. 14 is a front view of an apparatus 1400 for incentivizing a usage of a waste disposal device 1402 by a user, in accordance with some embodiments.
Figure 15:
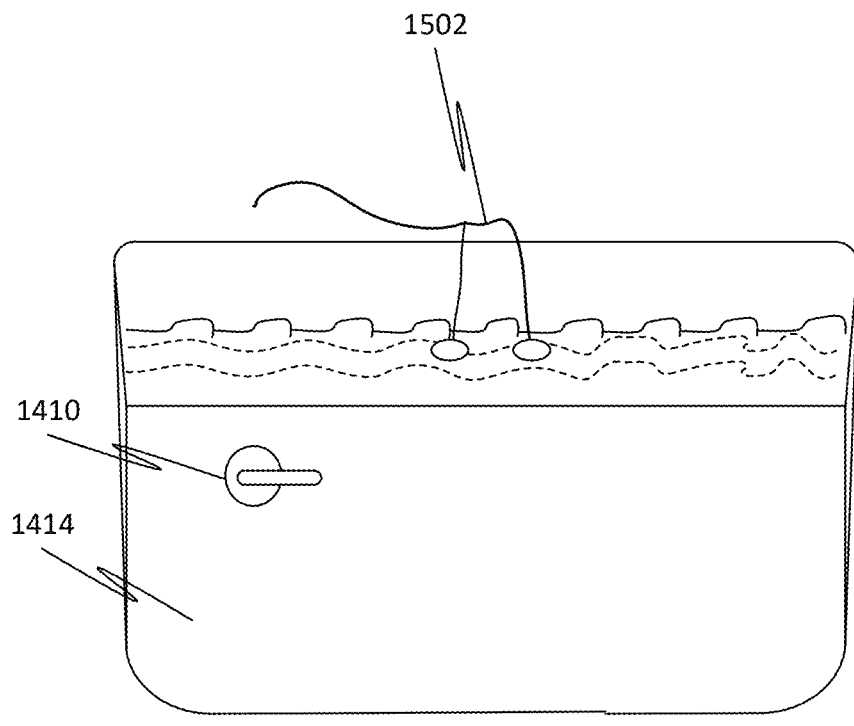
FIG. 15 is a top perspective view of the cleaning agent reservoir without the lid 1416, in accordance with some embodiments.

FIG. 14 is a front view of an apparatus 1400 for incentivizing a usage of a waste disposal device 1402 by a user, in accordance with some embodiments. Further, the apparatus may include a cleaning agent dispensing mechanism 1404, an action item 1406, and at least one probe 1502 (i.e. a sensor), as shown in FIG. 15. Further, the cleaning agent dispensing mechanism 1404 may include a cleaning agent reservoir (i.e. a tank) 1408 and a triggering device (i.e. a flush handle) 1410. Further, the waste disposal device 1402 may include a sanitary unit 1412. Further, the cleaning agent reservoir 1408 may include a body 1414 and a lid 1416. Further, the cleaning agent reservoir 1408 may store a cleaning agent (i.e. water). Further, the at least one probe 1502 may be disposed in the cleaning agent reservoir 1408. Further, the action item 1406 may be connected with the at least one probe 1502 using a probe wire. Further, the cleaning agent lowers after the flush initiates. Further, the at least one probe 1502 performs water detection by conduction between two connective ends resting in the cleaning agent reservoir 1408 before the flush is initiated.

FIG. 15 is a top perspective view of the cleaning agent reservoir without the lid 1416, in accordance with some embodiments.

Figure 16:
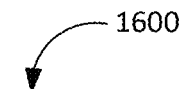
FIG. 16 is a front view of an apparatus 1600 for incentivizing a usage of a waste disposal device 1608 by a user, in accordance with some embodiments.
Figure 16:
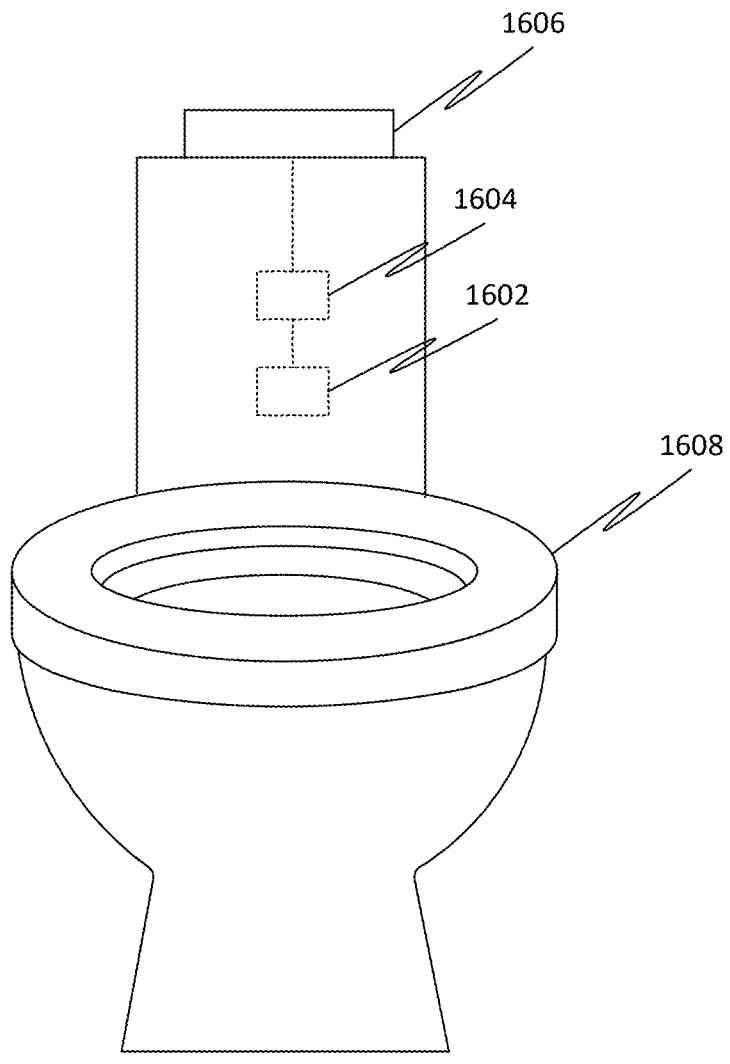

FIG. 16 is a front view of an apparatus 1600 for incentivizing a usage of a waste disposal device 1608 by a user, in accordance with some embodiments. Accordingly, the apparatus 1600 may include at least one sensor 1602, a processor 1604, and at least one auxiliary device 1606.

Further, the at least one sensor 1602 may be configured for monitoring at least one parameter associated with the waste disposal device 1608.

Further, the processor 1604 may be communicatively coupled with the at least one sensor 1602. Further, the processor 1604 may be configured for obtaining at least one information associated with the at least one parameter based on the monitoring of the at least one parameter. Further, the processor 1604 may be configured for analyzing the at least one information. Further, the processor 1604 may be configured for determining an initiation of a performance of at least one waste disposing operation associated with the waste disposal device 1608 based on the analyzing of the at least one information. Further, the waste disposal device 1608 disposes of at least one waste through the at least one waste disposing operation. Further, the at least one waste disposing operation may be activated through a predetermined user action performed by a user. Further, the processor 1604 may be configured for generating at least one initiation command based on the determining of the initiation.

Further, the at least one auxiliary device 1606 may be operatively coupled with the processor 1604. Further, the at least one auxiliary device 1606 may be powered. Further, the at least one auxiliary device 1606 may be configured for initiating a performance of at least one auxiliary operation based on the at least one initiation command. Further, the performance of the at least one auxiliary operation corresponds to at least one reward for the user of the waste disposal device 1608. Further, the performance of the at least one auxiliary operation terminates after a completion of the performance of the at least one auxiliary operation. Further, the at least one auxiliary operation may include at least one action performed by the at least one auxiliary device 1606. Further, the at least one action may include at least one of a production of at least one movement by at least one movable element of the at least one auxiliary device 1606 and an emission of at least one sound by at least one sound emitting element of the at least one auxiliary device 1606.

Figure 17:
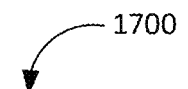
FIG. 17 is a front perspective view of an apparatus 1700 for incentivizing a usage of a waste disposal device 1708 by a user, in accordance with some embodiments.
Figure 17:
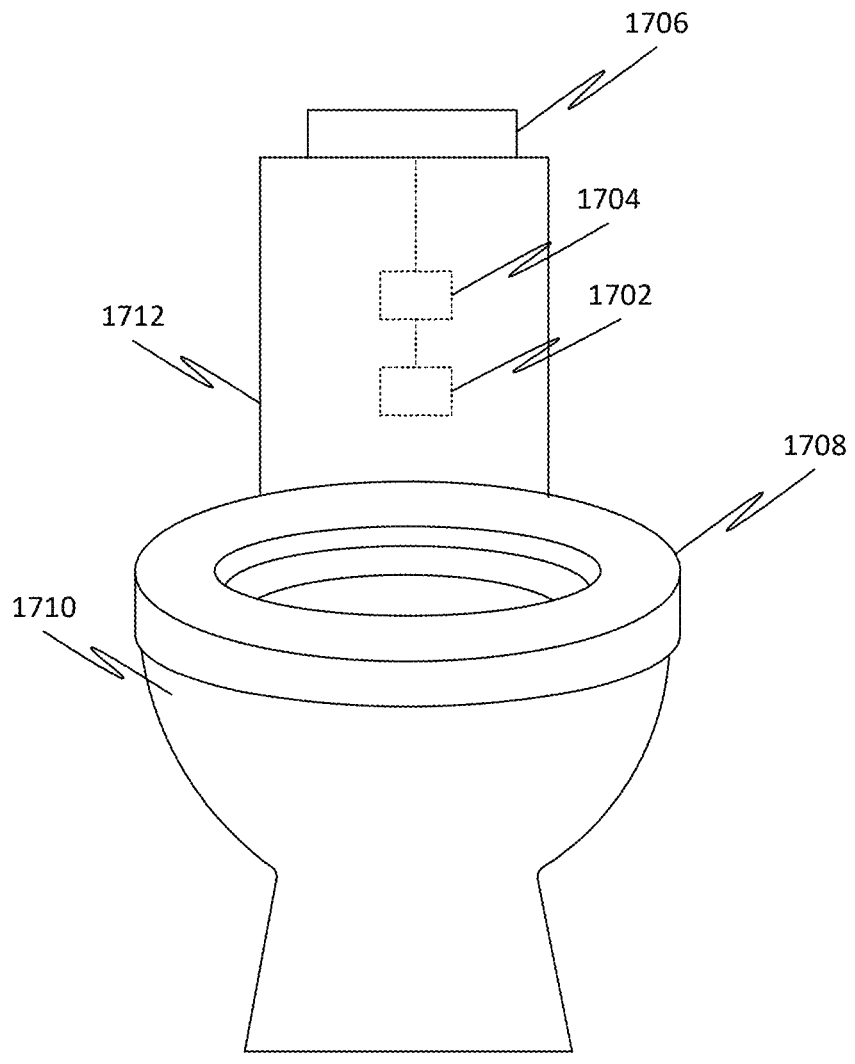

FIG. 17 is a front perspective view of an apparatus 1700 for incentivizing a usage of a waste disposal device 1708 by a user, in accordance with some embodiments. Accordingly, the apparatus 1700 may include the waste disposal device 1708, at least one sensor 1702, a processor 1704, and at least one auxiliary device 1706.

Further, the waste disposal device 1708 may include at least one sanitary unit 1710 and at least one waste disposing mechanism 1712. Further, the at least one waste disposing mechanism 1712 may be configured for performing at least one waste disposing operation.

Further, the at least one sensor 1702 may be configured for monitoring at least one parameter associated with the waste disposal device 1708.

Further, the processor 1704 may be communicatively coupled with the at least one sensor 1702. Further, the processor 1704 may be configured for obtaining at least one information associated with the at least one parameter based on the monitoring of the at least one parameter. Further, the processor 1704 may be configured for analyzing the at least one information. Further, the processor 1704 may be configured for determining an initiation of a performance of the at least one waste disposing operation associated with the waste disposal device 1708 based on the analyzing of the at least one information. Further, the waste disposal device 1708 disposes of at least one waste through the at least one waste disposing operation. Further, the at least one waste disposing operation may be activated through a predetermined user action performed by a user. Further, the processor 1704 may be configured for generating at least one initiation command based on the determining of the initiation.

Further, the at least one auxiliary device 1706 may be operatively coupled with the processor 1704. Further, the at least one auxiliary device 1706 may be powered. Further, the at least one auxiliary device 1706 may be configured for initiating a performance of at least one auxiliary operation based on the at least one initiation command. Further, the performance of the at least one auxiliary operation corresponds to at least one reward for the user of the waste disposal device 1708. Further, the performance of the at least one auxiliary operation terminates after a completion of the performance of the at least one auxiliary operation.

Figure 18:
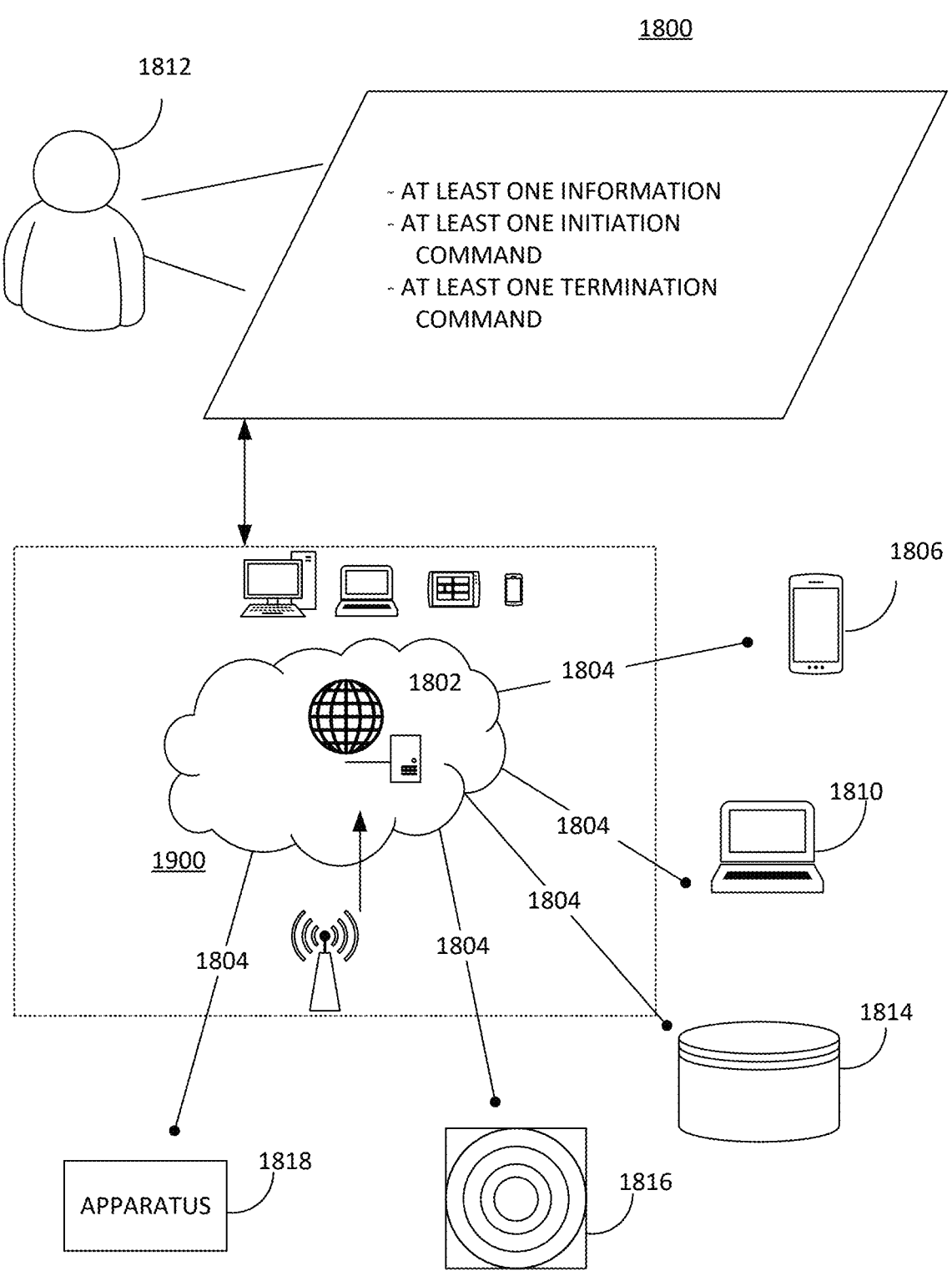
FIG. 18 is an illustration of an online platform consistent with various embodiments of the present disclosure.

FIG. 18 is an illustration of an online platform 1800 consistent with various embodiments of the present disclosure. By way of non-limiting example, the online platform 1800 to facilitate incentivizing a usage of a waste disposal device by a user may be hosted on a centralized server 1802, such as, for example, a cloud computing service. The centralized server 1802 may communicate with other network entities, such as, for example, a mobile device 1806 (such as a smartphone, a laptop, a tablet computer, etc.), other electronic devices 1810 (such as desktop computers, server computers, etc.), databases 1814, sensors 1816, and an apparatus 1818 (such as the apparatus 100, the apparatus 1400, the apparatus 1600, the apparatus 1700, etc.) over a communication network 1804, such as, but not limited to, the Internet. Further, users of the online platform 1800 may include relevant parties such as, but not limited to, end-users, administrators, service providers, service consumers, and so on. Accordingly, in some instances, electronic devices operated by the one or more relevant parties may be in communication with the platform.

A user 1812, such as the one or more relevant parties, may access online platform 1800 through a web based software application or browser. The web based software application may be embodied as, for example, but not be limited to, a website, a web application, a desktop application, and a mobile application compatible with a computing device 1900.

Figure 19:
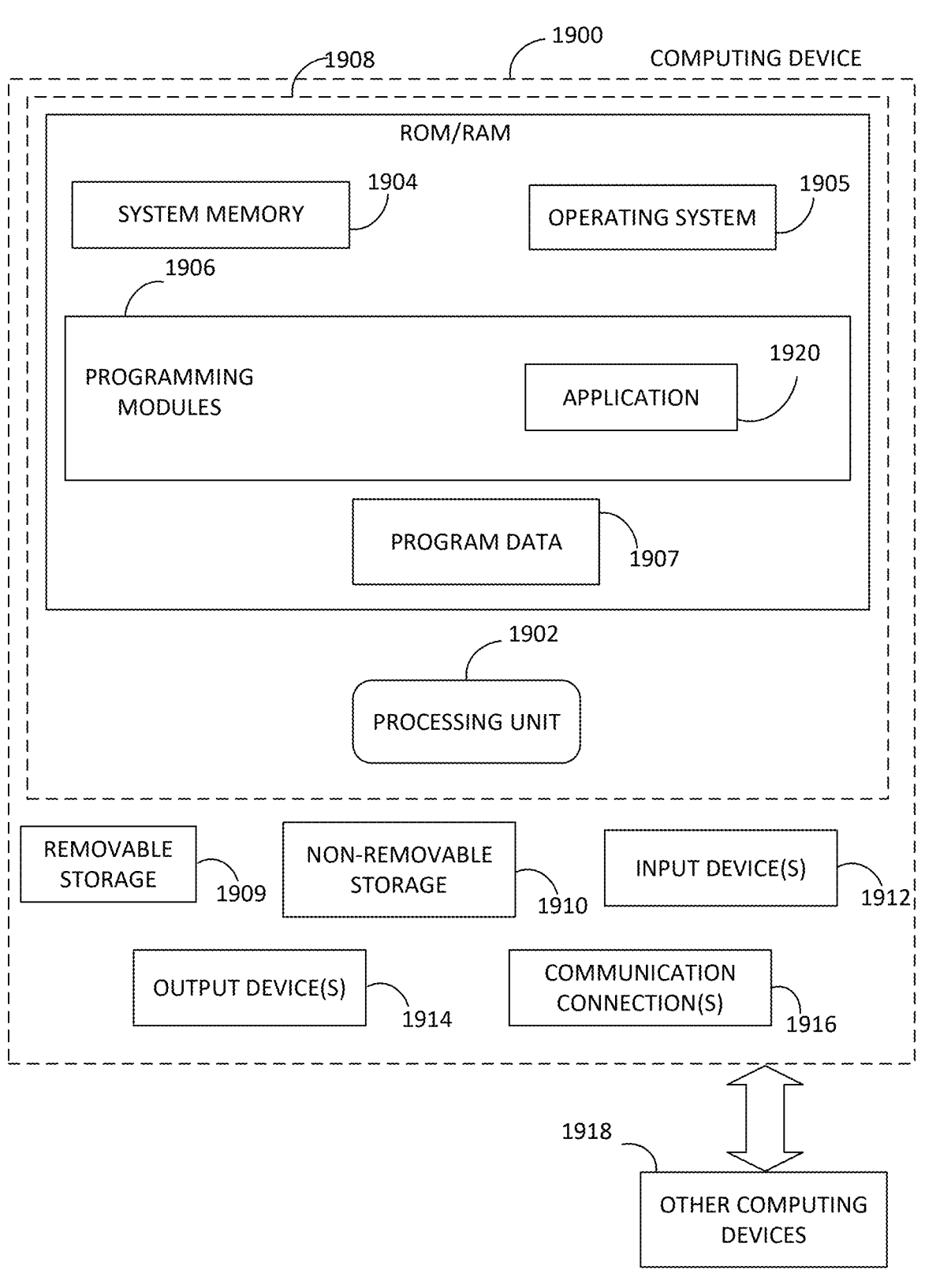
FIG. 19 is a block diagram of a computing device for implementing the methods disclosed herein, in accordance with some embodiments.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random-access memory (RAM)), non-volatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and non-volatile, removable, and non-removable media implemented in any method or technology for storage of information, such as computer-readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, a location sensor, a camera, a biometric sensor, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 (e.g., application 1920 such as a media player) may perform processes including, for example, one or more stages of methods, algorithms, systems, applications, servers, databases as described above. The aforementioned process is an example, and processing unit 1902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for incentivizing a usage of a waste disposal device by a user, the apparatus comprising:
at least one sensor configured for monitoring at least one parameter associated with the waste disposal device;
a processor communicatively coupled with the at least one sensor, wherein the processor is configured for:
obtaining at least one information associated with the at least one parameter based on the monitoring of the at least one parameter;
analyzing the at least one information;
determining an initiation a performance of at least one waste disposing operation associated with the waste disposal device based on the analyzing of the at least one information, wherein the waste disposal device disposes of at least one waste through the at least one waste disposing operation, wherein the at least one waste disposing operation is activated through a predetermined user action performed by a user; and
generating at least one initiation command based on the determining of the initiation; and
at least one auxiliary device operatively coupled with the processor, wherein the at least one auxiliary device is powered, wherein the at least one auxiliary device is configured for initiating a performance of at least one auxiliary operation based on the at least one initiation command, wherein the performance of the at least one auxiliary operation corresponds to at least one reward for the user of the waste disposal device, wherein the performance of the at least one auxiliary operation terminates after a completion of the performance of the at least one auxiliary operation, wherein the at least one auxiliary operation comprises at least one action performed by the at least one auxiliary device, wherein the at least one action comprises a production of at least one movement by at least one movable element of the at least one auxiliary device.

2. The apparatus of claim 1, wherein the at least one action further comprises an emission of at least one sound by at least one sound emitting element of the at least one auxiliary device.

3. The apparatus of claim 1, wherein the waste disposal device comprises at least one sanitary unit and at least one waste disposing mechanism, wherein the at least one waste disposing mechanism is configured for performing the at least one waste disposing operation.

4. The apparatus of claim 3, wherein the at least one waste disposing mechanism comprises at least one cleaning agent dispensing mechanism, wherein the at least one cleaning agent dispensing mechanism is configured for dispensing at least one cleaning agent into the at least one sanitary unit through at least one port comprised in the at least one sanitary unit, wherein the performing of the at least one waste disposing operation comprises the dispensing of the at least one cleaning agent into the at least one sanitary unit.

5. The apparatus of claim 4, wherein the at least one parameter comprises a flow rate of the at least one cleaning agent dispensible into the at least one sanitary unit through the at least one port, wherein the processor is further configured for comparing the flow rate of the at least one cleaning agent with a reference flow rate of zero based on the analyzing of the at least one information, wherein the determining of the initiation of the performance of the at least one waste disposing operation is further based on the comparing of the flow rate.

6. The apparatus of claim 4, wherein the at least one cleaning agent dispensing mechanism comprises at least one cleaning agent reservoir and at least one dispensing actuator coupled with the at least one cleaning agent reservoir, wherein the at least one cleaning agent reservoir is fluidly coupled with the at least one port, wherein the at least one cleaning agent reservoir is configured for storing the at least one cleaning agent, wherein the at least one dispensing actuator is configured to be transitioned between a first state and a second state, wherein the at least one dispensing actuator allows flowing of the at least one cleaning agent from the at least one cleaning agent reservoir to the at least one sanitary unit through the at least one port in the first state, wherein the at least one dispensing actuator restricts the flowing of the at least one cleaning agent from the at least one cleaning agent reservoir to the at least one sanitary unit through the at least one port in the second state, wherein the dispensing of the at least one cleaning agent into the at least one sanitary unit comprises the flowing of the at least one cleaning agent from the at least one cleaning agent reservoir to the at least one sanitary unit through the at least one port.

7. The apparatus of claim 6, wherein the at least one parameter comprises an amount of the at least one cleaning agent stored in the at least one cleaning agent reservoir, wherein the processor is further configured for comparing the amount of the at least one cleaning agent stored in the at least one cleaning agent reservoir with a threshold amount of the at least one cleaning agent, wherein the determining of the initiation of the performance of the at least one waste disposing operation is further based on the comparing.

8. The apparatus of claim 3, wherein the waste disposal device further comprises at least one triggering device, wherein the at least one triggering device is configured for:
receiving at least one input from the user; and
actuating the at least one waste disposing mechanism based on the receiving of the at least one input, wherein the performing of the at least one waste disposing operation is based on the actuating of the at least one waste disposing mechanism.

9. The apparatus of claim 8, wherein the at least one parameter comprises a condition associated with at least one of the at least one triggering device and the at least one sanitary unit, wherein the processor is further configured for comparing the condition with at least one predetermined condition associated with at least one of the at least one triggering device and the at least one sanitary unit based on the analyzing of the at least one information, wherein the determining of the initiation of the performance of the at least one waste disposing operation is further based on the comparing of the condition.

10. The apparatus of claim 8, wherein the at least one auxiliary device comprises at least one auxiliary unit and at least one coupling mechanism, wherein the at least one coupling mechanism is operatively coupled with the at least one auxiliary unit, wherein the at least one coupling mechanism is configured for actuating the at least one auxiliary unit based on the actuating of the at least one waste disposing mechanism, wherein the at least one auxiliary unit is configured for performing the at least one auxiliary operation, wherein the performing of the at least one auxiliary operation is based on the actuating of the at least one auxiliary unit.

11. The apparatus of claim 10, wherein the at least one auxiliary unit is operatively coupled with the at least one waste disposing mechanism, wherein the at least one waste disposing mechanism is further configured for powering the at least one auxiliary unit based on the performing of the at least one waste disposing operation, wherein the performing of the at least one waste disposing operation powers the at least one auxiliary unit, wherein the performing of the at least one auxiliary operation is further based on the powering of the at least one auxiliary unit.

12. The apparatus of claim 1 further comprising at least one additional sensor communicatively coupled with the processor, wherein the at least one additional sensor is configured for detecting a user action of the user, wherein the processor is further configured for:

obtaining at least one user action information associated with the user action based on the detecting;

analyzing the at least one user action information; and determining a performance of the predetermined user action by the user based on the analyzing of the at least one user action information, wherein the determining of the initiation of the performance of the at least one waste disposing operation is further based on the performance of the predetermined user action.

13. The apparatus of claim 12, wherein the analyzing of the at least one user action information comprises analyzing the at least one user action information using at least one machine learning model, wherein the analyzing of the at least one user action information using the at least one machine learning model comprises:

extracting a plurality of action features representing at least one action characteristic of the user action from the at least one user action information;

inputting the plurality of action features into the at least one machine learning model, wherein the at least one machine learning model is configured for detecting the performance of the predetermined user action; and obtaining an action output indicating a likelihood of the performance of the predetermined user action from the at least one machine learning model, wherein the determining of the performance of the predetermined user action is further based on the action output.

14. The apparatus of claim 13, wherein the analyzing of the at least one information comprises analyzing the at least one information using at least one additional machine learning model, wherein the analyzing of the at least one information using the at least one additional machine learning model comprises:

extracting a plurality of operation features representing at least one operation characteristic of the at least one waste disposing operation from the at least one information;

inputting the plurality of operation features and the plurality of action features into the at least one additional machine learning model, wherein the at least one additional machine learning model is configured for detecting the initiation of the performance of the at least one waste disposing operation; and obtaining an operation output indicating a likelihood of the initiation of the performance of the at least one waste disposing operation from the at least one additional machine learning model, wherein the determining of the initiation of the performance of the at least one waste disposing operation is further based on the operation output.

15. The apparatus of claim 1, wherein the at least one parameter comprises a sound associated with the waste disposal device, wherein the analyzing of the at least one information comprises:

performing a sound spectrum analysis on the at least one information;

generating a plurality of sound spectrums based on the performing of the sound spectrum analysis;

inputting the plurality of sound spectrums in a first machine learning model, wherein the first machine learning model is trained using a training data comprising a plurality of training samples, wherein each of the plurality of training samples comprises a training sound spectrum and a sound identifier corresponding to the training sound spectrum, wherein the first machine learning model is configured for analyzing the plurality of sound spectrums for determining a likelihood of a sound sample comprised in the sound is a waste disposing operation sound associated with the at least one waste disposing operation; and obtaining an output indicating the likelihood of the sound sample comprised in the sound is the waste disposing operation sound from the first machine learning model, wherein the determining of the initiation of the performance of the at least one waste disposing operation is further based on the output.

16. The apparatus of claim 1, wherein the at least one parameter comprises an odor associated with the waste disposal device, wherein the analyzing of the at least one information comprises sequentially analyzing the at least one information, wherein the processor is further configured for:

determining a trend of an intensity of the odor based on the sequentially analyzing; and determining an indication in the trend indicating a decline in the intensity of the odor based on the determining of the trend, wherein the determining of the initiation of the performance of the at least one waste disposing operation is further based on the determining of the indication in the trend.

17. The apparatus of claim 1 further comprising at least one activation sensor communicatively coupled with the processor, wherein the at least one activation sensor is configured for monitoring an environment condition associated with an environment of the waste disposal device, wherein the processor is further configured for:

obtaining at least one environment condition information associated with the environment condition based on the monitoring of the environment condition;

analyzing the at least one environment condition information;

determining the environment condition being an activating environment condition based on the analyzing of the at least one condition information; and generating at least one activation command for the at least one auxiliary device based on the determining of the environment condition being the activating environment condition, wherein the at least one auxiliary device is further configured to be transitioned to an active state from an inactive state based on the at least one activation command, wherein the initiating of the performance of the at least one auxiliary operation is further based on the active state of the at least one auxiliary device.

18. The apparatus of claim 17, wherein the at least one auxiliary device remains in the inactive state until the at least one auxiliary device transitions to the active state from the inactive state, wherein the at least one auxiliary device is further configured to be transitioned to the inactive state from the active state after the completion of the performance of the at least one auxiliary operation, and an elapsing of at least one time duration.

19. An apparatus for incentivizing a usage of a waste disposal device by a user, the apparatus comprising:

at least one sensor configured for monitoring at least one parameter associated with the waste disposal device;

a processor communicatively coupled with the at least one sensor, wherein the processor is configured for:

obtaining at least one information associated with the at least one parameter based on the monitoring of the at least one parameter;

analyzing the at least one information;

determining an initiation of a performance of at least one waste disposing operation associated with the waste disposal device based on the analyzing of the at least one information, wherein the waste disposal device disposes of at least one waste through the at least one waste disposing operation, wherein the at least one waste disposing operation is activated through a predetermined user action performed by a user; and generating at least one initiation command based on the determining of the initiation; and at least one auxiliary device operatively coupled with the processor, wherein the at least one auxiliary device is powered, wherein the at least one auxiliary device is configured for initiating a performance of at least one auxiliary operation based on the at least one initiation command, wherein the performance of the at least one auxiliary operation corresponds to at least one reward for the user of the waste disposal device, wherein the performance of the at least one auxiliary operation terminates after a completion of the performance of the at least one auxiliary operation, wherein the at least one auxiliary operation comprises at least one action performed by the at least one auxiliary device, wherein the at least one action comprises each of a production of at least one movement by at least one movable element of the at least one auxiliary device and an emission of at least one sound by at least one sound emitting element of the at least one auxiliary device.

20. An apparatus for incentivizing a usage of a waste disposal device by a user, the apparatus comprising:

the waste disposal device comprising at least one sanitary unit and at least one waste disposing mechanism, wherein the at least one waste disposing mechanism is configured for performing at least one waste disposing operation;

at least one sensor configured for monitoring at least one parameter associated with the waste disposal device;

a processor communicatively coupled with the at least one sensor, wherein the processor is configured for:

obtaining at least one information associated with the at least one parameter based on the monitoring of the at least one parameter;

analyzing the at least one information;

determining an initiation of a performance of the at least one waste disposing operation associated with the waste disposal device based on the analyzing of the at least one information, wherein the waste disposal device disposes of at least one waste through the at least one waste disposing operation, wherein the at least one waste disposing operation is activated through a predetermined user action performed by a user; and generating at least one initiation command based on the determining of the initiation; and at least one auxiliary device operatively coupled with the processor, wherein the at least one auxiliary device is powered, wherein the at least one auxiliary device is configured for initiating a performance of at least one auxiliary operation based on the at least one initiation command, wherein the performance of the at least one auxiliary operation corresponds to at least one reward for the user of the waste disposal device, wherein the performance of the at least one auxiliary operation terminates after a completion of the performance of the at least one auxiliary operation, wherein the at least one auxiliary operation comprises at least one action performed by the at least one auxiliary device, wherein the at least one action comprises a production of at least one movement by at least one movable element of the at least one auxiliary device.

* * * * *